United States Patent
Nagaraja et al.

(10) Patent No.: US 11,477,164 B2
(45) Date of Patent: Oct. 18, 2022

(54) METHOD, SYSTEM, AND COMPUTER PROGRAM PRODUCT FOR PREVENTING TRANSMISSION OF MALICIOUS DATA

(71) Applicant: Visa International Service Association, San Francisco, CA (US)

(72) Inventors: Vinjith Nagaraja, Austin, TX (US); Raymond Scott Brammer, Round Rock, TX (US); James L. Myers, Jr., Round Rock, TX (US); Keeshini Manivannan, Cedar Park, TX (US)

(73) Assignee: Visa International Service Association, San Francisco, CA (US)

(*) Notice: Subject to any disclaimer, the term of this patent is extended or adjusted under 35 U.S.C. 154(b) by 397 days.

(21) Appl. No.: 16/711,601

(22) Filed: Dec. 12, 2019

(65) Prior Publication Data

US 2021/0185008 A1 Jun. 17, 2021

(51) Int. Cl.
*H04L 9/40* (2022.01)
*G06Q 20/40* (2012.01)
*G06N 7/00* (2006.01)
*G06N 20/00* (2019.01)

(52) U.S. Cl.
CPC ......... *H04L 63/0245* (2013.01); *G06N 7/005* (2013.01); *G06N 20/00* (2019.01); *G06Q 20/4016* (2013.01); *H04L 63/1416* (2013.01)

(58) Field of Classification Search
CPC . H04L 63/0245; H04L 63/1416; G06N 20/00; G06N 7/005; G06Q 20/4016
See application file for complete search history.

(56) References Cited

U.S. PATENT DOCUMENTS

| | | | |
|---|---|---|---|
| 7,644,150 B1 * | 1/2010 | Nucci | H04L 67/104 709/204 |
| 9,349,102 B2 | 5/2016 | Sen et al. | |
| 9,483,742 B1 * | 11/2016 | Ahmed | H04L 63/1441 |
| 10,187,413 B2 | 1/2019 | Vasseur et al. | |
| 2010/0281539 A1 * | 11/2010 | Burns | H04L 63/1441 726/13 |
| 2018/0307833 A1 * | 10/2018 | Noeth | H04L 63/1416 |
| 2019/0385170 A1 * | 12/2019 | Arrabothu | G06N 7/005 |

OTHER PUBLICATIONS

Machine translation of Chinese patent application No. CN 109450842A, Abstract only, Chen H. (Year: 2019).*

(Continued)

*Primary Examiner* — Shanto Abedin
(74) *Attorney, Agent, or Firm* — The Webb Law Firm

(57) ABSTRACT

A method for preventing transmission of malicious data may include receiving transaction data including at least one packet associated with a payment transaction; extracting at least one of network layer data or transport layer data from a header of the at least one packet; determining a first probability indicating that the at least one packet is in a first class based on the at least one of the network layer data or the transport layer data using a classifier. The method may also include determining a second probability indicating that the at least one packet is in a second class based on the at least one of the network layer data or the transport layer data using the classifier; and blocking the at least one packet. A system and a computer program product are also disclosed.

18 Claims, 11 Drawing Sheets

(56) References Cited

OTHER PUBLICATIONS

Machine translation of Chinese patent application No. CN 110225001B, Abstract only, Jiang Y. (Year: 2021).*
Bekerman et al., "Unknown Malware Detection Using Network Traffic Classification," 2015 IEEE Conference on Communications and Network Security (CNS), 2015, pp. 134-142.
Nguyen et al., "A Survey of Techniques for Internet Traffic Classification using Machine Learning," IEEE Communications Surveys and Tutorials, Mar. 12, 2008, pp. 1-21.
Rodrigues et al., "Cybersecurity and Network Forensics: Analysis of Malicious Traffic towards a Honeynet with Deep Packet Inspection," Applied Sciences, 2017, pp. 1-29., 7, 1082.
Vargas-Munoz et al., "Classification of Network Anomalies in Flow Level Network Traffic Using Bayesian Networks", International Conference on Electronics, Communications and Computers (CONIELECOMP), Feb. 2018, pp. 238-243.
Yu et al., "QoS-aware Traffic Classification Architecture Using Machine Learning and Deep Packet Inspection in SDNs", 131 Procedia Computer Science, 2018, pp. 1209-1216.
Zulman, "Multiclassifier: A Combination of DPI and ML for Application-Layer Classification in SDN", BAIXARDOC, uploaded Aug. 2018, 30 pgs.

* cited by examiner

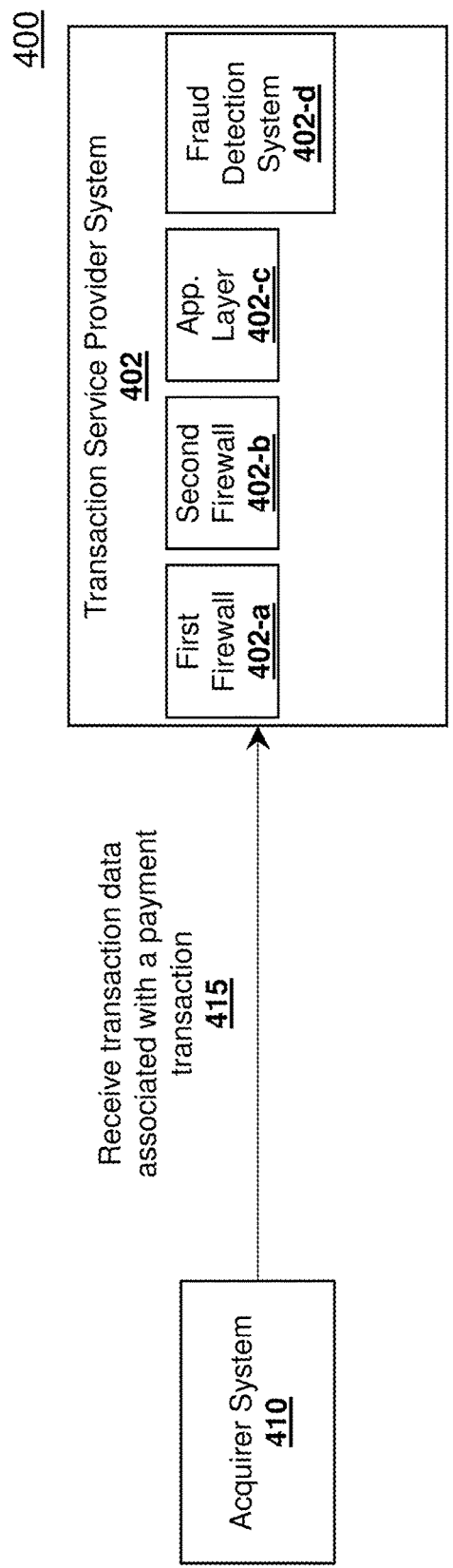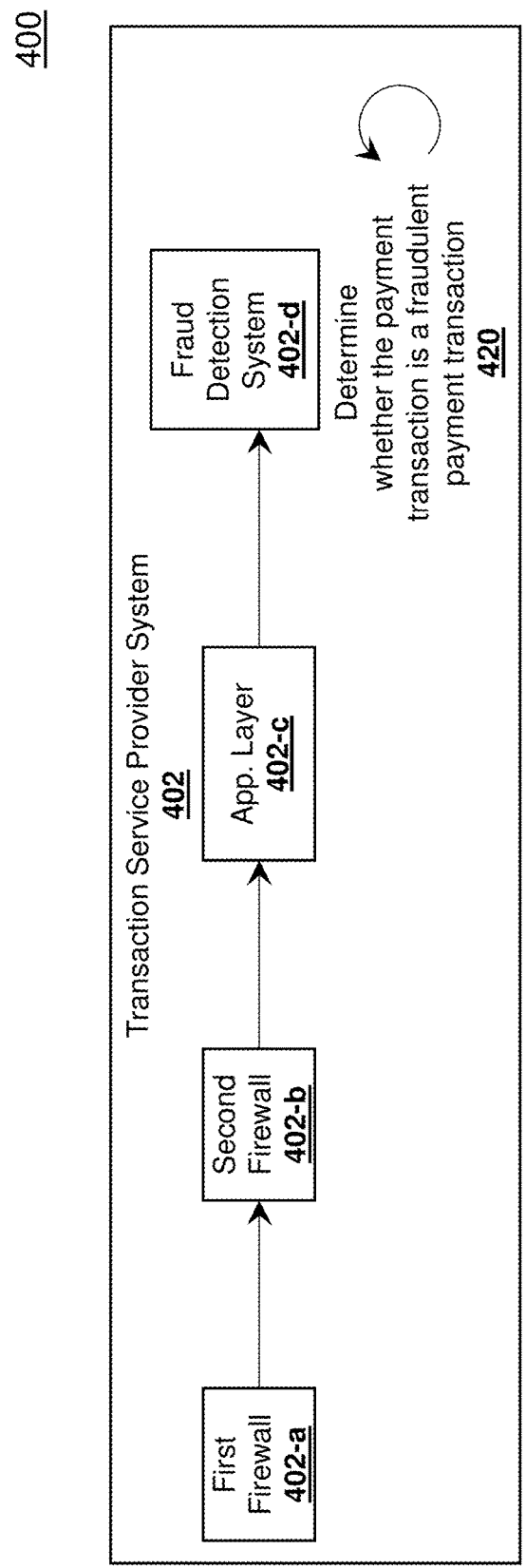

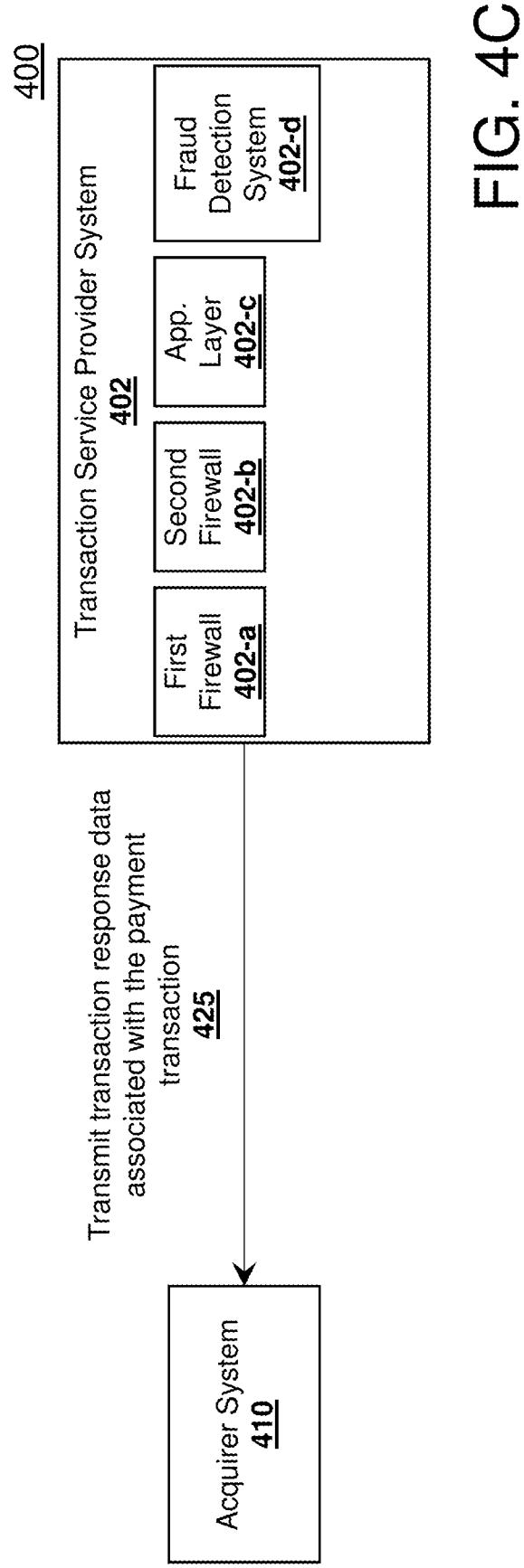

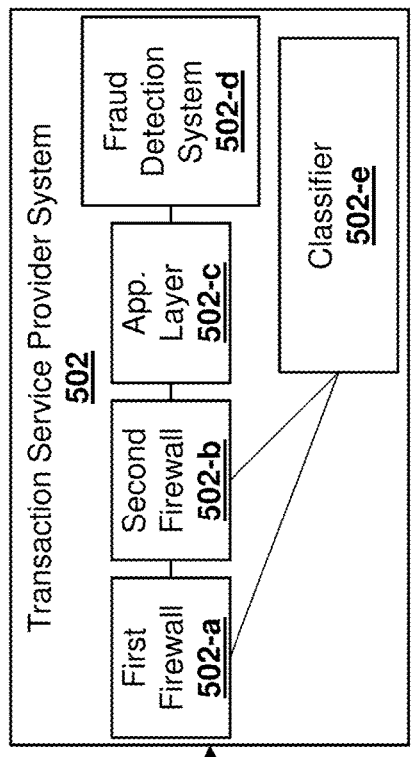
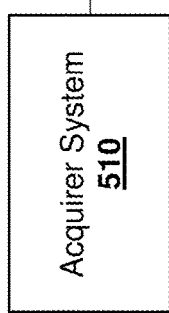
FIG. 5A

METHOD, SYSTEM, AND COMPUTER PROGRAM PRODUCT FOR PREVENTING TRANSMISSION OF MALICIOUS DATA

BACKGROUND

1. Field

This disclosed subject matter relates generally to methods, systems, and computer program products for preventing transmission of malicious data and, in some particular embodiments, to a method, system, and computer program product for preventing transmission of malicious data by blocking at least one packet using a trained classifier.

2. Technical Considerations

Systems involved in the processing of payment transactions, such as systems associated with transaction service providers, payment gateways, issuer institutions, acquirer institutions, and/or the like, may receive malicious data intended to consume the computing resources of such systems. Although the systems that receive the malicious data may implement fraud detection systems configured to identify the malicious data, depending on the amount of malicious data being processed these fraud detection systems may be overloaded. As a result, later-received data associated with non-fraudulent payment transactions may be put into a queue to be processed by the fraud detection systems, causing the amount of time associated with authorizing the payment transactions to be extended. Additionally or alternatively, the systems that receive the malicious data may allocate additional computing resources to identify the malicious data.

SUMMARY

Accordingly, it is an object of the presently disclosed subject matter to provide methods, systems, and computer program products for preventing transmission of malicious data.

According to non-limiting embodiments or aspects, provided is a computer-implemented method for preventing transmission of malicious data. In some non-limiting embodiments, a computer-implemented method for preventing transmission of malicious data may include receiving, with at least one processor, transaction data comprising at least one packet associated with a payment transaction; extracting, with at least one processor, at least one of network layer data or transport layer data from a header of the at least one packet; determining, with at least one processor, a first probability indicating that the at least one packet is in a first class based on the at least one of the network layer data or the transport layer data using a classifier; determining with at least one processor, a second probability indicating that the at least one packet is in a second class based on the at least one of the network layer data or the transport layer data using the classifier; and blocking, with at least one processor, the at least one packet.

According to non-limiting embodiments or aspects, provided is a system for preventing transmission of malicious data. In some non-limiting embodiments, the system for preventing transmission of malicious data may include at least one processor programmed or configured to: receive transaction data comprising at least one packet associated with a payment transaction; extract at least one of network layer data or transport layer data from a header of the at least one packet; determine a first probability indicating that the at least one packet is in a first class based on the at least one of the network layer data or the transport layer data using a classifier; determine a second probability indicating that the at least one packet is in a second class based on the at least one of the network layer data or the transport layer data using the classifier; and determine whether the first probability indicating that the at least one packet is in the first class is greater than the second probability indicating that the at least one packet is in the second class, wherein, in response to determining that the first probability indicating that the at least one packet is in the first class is greater than the second probability indicating that the at least one packet is in the second class, the at least one processor is programmed or configured to block the at least one packet; and wherein, in response to determining that the first probability indicating that the at least one packet is in the first class is less than the second probability indicating that the at least one packet is in the second class, the at least one processor is programmed or configured to permit the at least one packet to be transmitted to be forwarded.

According to non-limiting embodiments or aspects, provided is a computer program product for preventing transmission of malicious data. The computer program product may include at least one non-transitory computer-readable medium including at least one instructions that, when executed by at least one processor, cause the at least one processor to: receive transaction data comprising at least one packet associated with a payment transaction; extract at least one of network layer data or transport layer data from a header of the at least one packet; determine a first probability indicating that the at least one packet is in a first class based on the at least one of the network layer data or the transport layer data using a classifier; determine a second probability indicating that the at least one packet is in a second class based on the at least one of the network layer data or the transport layer data using the classifier; and determine whether the first probability indicating that the at least one packet is in the first class is greater than the second probability indicating that the at least one packet is in the second class; extract at least one of session layer data, presentation layer data, or application layer data from the at least one packet; determine a third probability indicating that the at least one packet is in the first class based on the at least one of the session layer data, the presentation layer data, or the application layer data and at least one of the network layer data or the transport layer data using the classifier; determine a fourth probability indicating that the at least one packet is in the second class based on the at least one of the session layer data, the presentation layer data, or the application layer data and the at least one of the network layer data or the transport layer data using the classifier; and determine a fifth probability indicating that the at least one packet is in a third class based on the at least one of the session layer data, the presentation layer data, or the application layer data and the at least one of the network layer data or the transport layer data using the classifier wherein, in response to determining that the first probability indicating that the at least one packet is in the first class is greater than the second probability indicating that the at least one packet is in the second class, the at least one instructions cause the at least one processor to block the at least one packet; and wherein, in response to determining that the first probability indicating that the at least one packet is in the first class is less than the second probability indicating that the at least one packet is in the second class, the at least one instructions cause the at least one processor to permit the at least one packet to be transmitted to be forwarded.

Further embodiments are set forth in the following numbered clauses:

Clause 1: A computer-implemented method, comprising: receiving, with at least one processor, transaction data comprising at least one packet associated with a payment transaction; extracting, with at least one processor, at least one of network layer data or transport layer data from a header of the at least one packet; determining, with at least one processor, a first probability indicating that the at least one packet is in a first class based on the at least one of the network layer data or the transport layer data using a classifier; determining with at least one processor, a second probability indicating that the at least one packet is in a second class based on the at least one of the network layer data or the transport layer data using the classifier; and blocking, with at least one processor, the at least one packet.

Clause 2: The computer-implemented method of clause 1, further comprising: determining that the first probability indicating that the at least one packet is in the first class is greater than the second probability indicating that the at least one packet is in the second class, wherein blocking the at least one packet from being transmitted comprises blocking the at least one packet based on determining that the first probability indicating that the at least one packet is in the first class is greater than the second probability indicating that the at least one packet is in the second class.

Clause 3: The computer-implemented method of clauses 1 or 2, further comprising: determining that the first probability indicating that the at least one packet is in the first class is less than the second probability indicating that the at least one packet is in the second class; extracting at least one of session layer data, presentation layer data, or application layer data from the at least one packet; determining a third probability indicating that the at least one packet is in the first class based on the at least one of the session layer data, the presentation layer data, or the application layer data and at least one of the network layer data or the transport layer data using the classifier; determining a fourth probability indicating that the at least one packet is in the second class based on the at least one of the session layer data, the presentation layer data, or the application layer data and at least one of the network layer data or the transport layer data using the classifier; and determining a fifth probability indicating that the at least one packet is in a third class based on the at least one of the session layer data, the presentation layer data, or the application layer data and the at least one of the network layer data or the transport layer data using the classifier.

Clause 4: The computer-implemented method of any of clauses 1-3, wherein blocking the at least one packet comprises: blocking the at least one packet based on determining that the third probability is greater than the fourth probability and the fifth probability.

Clause 5: The computer-implemented method of any of clauses 1-4, further comprising: determining that the fourth probability is greater than the third probability and the fifth probability; and forwarding the at least one packet to a separate computing device based on determining that the third probability is greater than the fourth probability and the fifth probability.

Clause 6: The computer-implemented method of any of clauses 1-5, further comprising: determining that the fifth probability is greater than the third probability and the fourth probability; and forwarding the at least one packet to a separate computing device based on determining that the fifth probability is greater than the third probability and the fourth probability.

Clause 7: The computer-implemented method of any of clauses 1-6, further comprising: determining that the fourth probability is greater than the third probability and the fifth probability; and forwarding the at least one packet to a risk scoring platform.

Clause 8: The computer-implemented method of any of clauses 1-7, further comprising: determining a score associated with the at least one packet based on the at least one of the third probability, the fourth probability, or the fifth probability; and adding the score to the header of the at least one packet.

Clause 9: A system, at least one processor programmed or configured to: receive transaction data comprising at least one packet associated with a payment transaction; extract at least one of network layer data or transport layer data from a header of the at least one packet; determine a first probability indicating that the at least one packet is in a first class based on the at least one of the network layer data or the transport layer data using a classifier; determine a second probability indicating that the at least one packet is in a second class based on the at least one of the network layer data or the transport layer data using the classifier; and determine whether the first probability indicating that the at least one packet is in the first class is greater than the second probability indicating that the at least one packet is in the second class, wherein, in response to determining that the first probability indicating that the at least one packet is in the first class is greater than the second probability indicating that the at least one packet is in the second class, the at least one processor is programmed or configured to block the at least one packet; and wherein, in response to determining that the first probability indicating that the at least one packet is in the first class is less than the second probability indicating that the at least one packet is in the second class, the at least one processor is programmed or configured to permit the at least one packet to be transmitted to be forwarded.

Clause 10: The system of clause 9, wherein the at least one processor is further programmed or configured to: determine that the first probability indicating that the at least one packet is in the first class is less than the second probability indicating that the at least one packet is in the second class; extract at least one of session layer data, presentation layer data, or application layer data from the at least one packet; determine a third probability indicating that the at least one packet is in the first class based on the at least one of the session layer data, the presentation layer data, or the application layer data and at least one of the network layer data or the transport layer data using the classifier; determine a fourth probability indicating that the at least one packet is in the second class based on the at least one of the session layer data, the presentation layer data, or the application layer data and the at least one of the network layer data or the transport layer data using the classifier; and determine a fifth probability indicating that the at least one packet is in a third class based on the at least one of the session layer data, the presentation layer data, or the application layer data and the at least one of the network layer data or the transport layer data using the classifier.

Clause 11: The system of clauses 9 or 10, wherein, when blocking the at least one packet, the at least one processor is programmed or configured to: block the at least one packet based on determining that the third probability is greater than the fourth probability and the fifth probability.

Clause 12: The system of any of clauses 9-11, wherein the at least one processor is further programmed or configured to: determine that the fourth probability is greater than the third probability and the fifth probability; and forward the at least one packet to a separate computing device based on determining that the third probability is greater than the fourth probability and the fifth probability.

Clause 13: The system of any of clauses 9-12, wherein the at least one processor is further programmed or configured to: determine that the fifth probability is greater than the third probability and the fourth probability; and forward the at least one packet to a separate computing device based on determining that the fifth probability is greater than the third probability and the fourth probability.

Clause 14: The system of any of clauses 9-13, wherein the at least one processor is further programmed or configured to: determine that the fourth probability is greater than the third probability and the fifth probability; and forward the at least one packet to a risk scoring platform.

Clause 15: The system of any of clauses 9-14, wherein the at least one processor is further programmed or configured to: determine a score associated with the at least one packet based on the at least one of the third probability, the fourth probability, or the fifth probability; and add the score to the header of the at least one packet.

Clause 16: A computer program product, comprising at least one non-transitory computer-readable medium comprising one or more instructions that, when executed by at least one processor, cause the at least one processor to: receive transaction data comprising at least one packet associated with a payment transaction; extract at least one of network layer data or transport layer data from a header of the at least one packet; determine a first probability indicating that the at least one packet is in a first class based on the at least one of the network layer data or the transport layer data using a classifier; determine a second probability indicating that the at least one packet is in a second class based on the at least one of the network layer data or the transport layer data using the classifier; and determine whether the first probability indicating that the at least one packet is in the first class is greater than the second probability indicating that the at least one packet is in the second class; extract at least one of session layer data, presentation layer data, or application layer data from the at least one packet; determine a third probability indicating that the at least one packet is in the first class based on the at least one of the session layer data, the presentation layer data, or the application layer data and at least one of the network layer data or the transport layer data using the classifier; determine a fourth probability indicating that the at least one packet is in the second class based on the at least one of the session layer data, the presentation layer data, or the application layer data and the at least one of the network layer data or the transport layer data using the classifier; and determine a fifth probability indicating that the at least one packet is in a third class based on the at least one of the session layer data, the presentation layer data, or the application layer data and the at least one of the network layer data or the transport layer data using the classifier; wherein, in response to determining that the first probability indicating that the at least one packet is in the first class is greater than the second probability indicating that the at least one packet is in the second class, the one or more instructions cause the at least one processor to block the at least one packet; and wherein, in response to determining that the first probability indicating that the at least one packet is in the first class is less than the second probability indicating that the at least one packet is in the second class, the one or more instructions cause the at least one processor to permit the at least one packet to be transmitted to be forwarded.

Clause 17: The computer program product of clause 16, wherein the one or more instructions that cause the at least one processor to block the at least one packet cause the at least one processor to: block the at least one packet based on determining that the third probability is greater than the fourth probability and the fifth probability.

Clause 18: The computer program product of clauses 16 or 17, wherein the one or more instructions further cause the at least one processor to: determine that the fifth probability is greater than the third probability and the fourth probability; and forward the at least one packet to a separate computing device based on determining that the fifth probability is greater than the third probability and the fourth probability.

Clause 19: The computer program product of any of clauses 16-18, wherein the one or more instructions further cause the at least one processor to: determine that the fourth probability is greater than the third probability and the fifth probability; and forward the at least one packet to a risk scoring platform.

Clause 20: The computer program product of any of clauses 16-19, wherein the one or more instructions further cause the at least one processor to: determine a score associated with the at least one packet based on the at least one of the third probability, the fourth probability, or the fifth probability; and add the score to the header of the at least one packet.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which:

FIGS. 4A-4C are diagrams of a non-limiting embodiment of an implementation of a non-limiting embodiment of a process for preventing transmission of malicious data according to the principles of the presently disclosed subject matter; and FIGS. 5A-5F are diagrams of a non-limiting embodiment of an implementation of a non-limiting embodiment of a process for preventing transmission of malicious data according to the principles of the present disclosure.

DESCRIPTION

Figure 1:
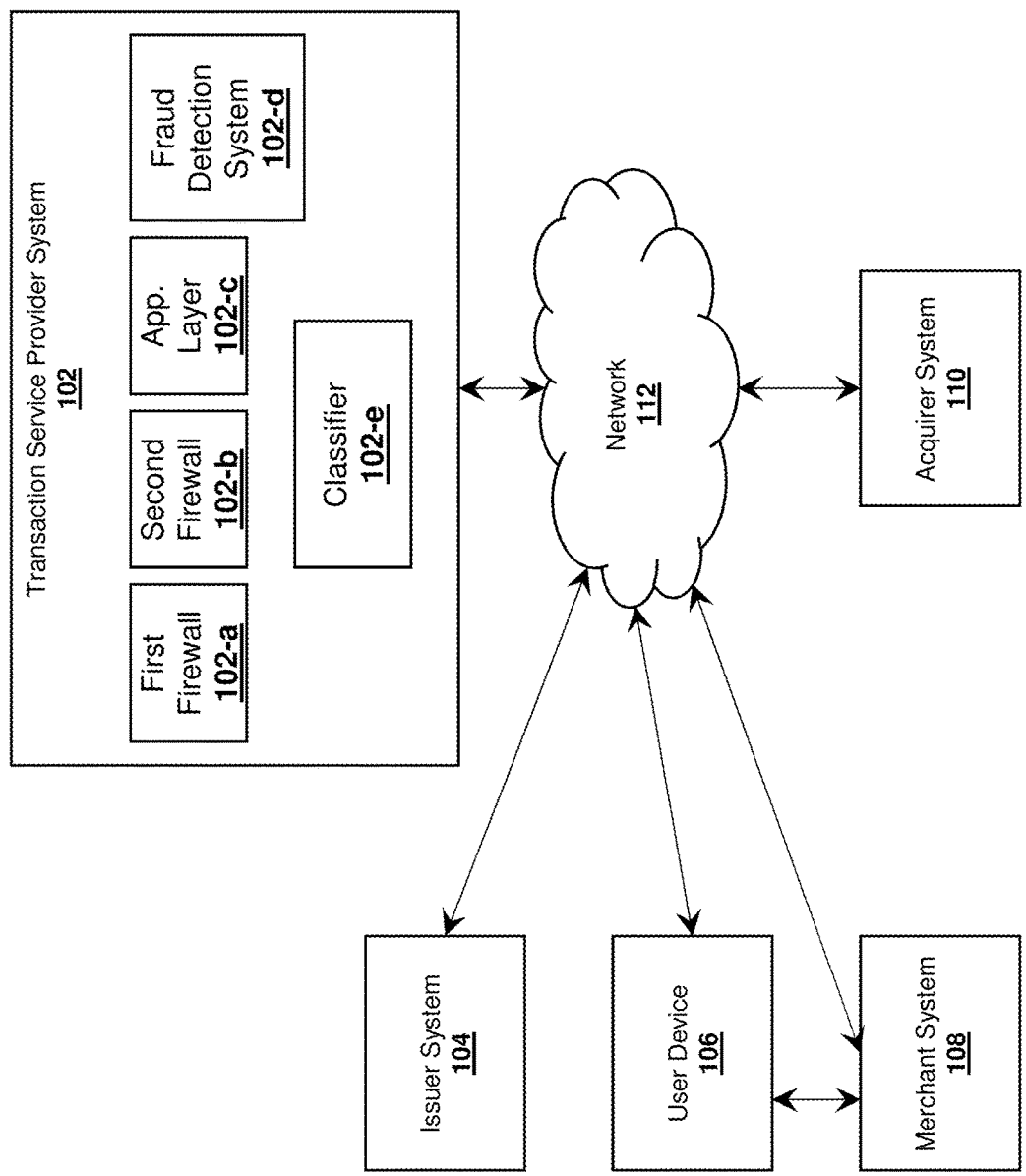
FIG. 1 is a diagram of a non-limiting embodiment of an environment in which systems, methods, and/or computer program products, described herein, may be implemented according to the principles of the presently disclosed subject matter.

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include at least one items and may be used interchangeably with "at least one" and "at least one." Furthermore, as used herein, the term "set" is intended to include at least one items (e.g., related items, unrelated items, a combination of related and unrelated items, and/or the like) and may be used interchangeably with "at least one" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the terms "issuer institution," "payment device issuer," "issuer," or "issuer bank" may refer to at least one entities that provide accounts to customers for conducting transactions (e.g., payment transactions), such as initiating credit and/or debit payments. For example, an issuer institution may provide an account identifier, such as a primary account number (PAN), to a customer that uniquely identifies at least one accounts associated with that customer. The account identifier may be embodied on a payment device, such as a physical financial instrument, e.g., a payment card, and/or may be electronic and used for electronic payments. The terms "issuer institution" and "issuer institution system" may also refer to at least one computer systems operated by or on behalf of an issuer institution, such as a server computer executing at least one software applications. For example, an issuer institution system may include at least one authorization servers for authorizing a transaction.

As used herein, the term "account identifier" may include at least one types of identifiers associated with a user account (e.g., a PAN, a card number, a payment card number, a payment token, and/or the like). In some non-limiting embodiments, an issuer institution may provide an account identifier (e.g., a PAN, a payment token, and/or the like) to a user that uniquely identifies at least one accounts associated with that user. The account identifier may be embodied on a physical financial instrument (e.g., a portable financial instrument, a payment card, a credit card, a debit card, and/or the like) and/or may be electronic information communicated to the user that the user may use for electronic payments. In some non-limiting embodiments, the account identifier may be an original account identifier, where the original account identifier was provided to a user at the creation of the account associated with the account identifier. In some non-limiting embodiments, the account identifier may be an account identifier (e.g., a supplemental account identifier) that is provided to a user after the original account identifier was provided to the user. For example, if the original account identifier is forgotten, stolen, and/or the like, a supplemental account identifier may be provided to the user. In some non-limiting embodiments, an account identifier may be directly or indirectly associated with an issuer institution such that an account identifier may be a payment token that maps to a PAN or other type of identifier. Account identifiers may be alphanumeric, any combination of characters and/or symbols, and/or the like. An issuer institution may be associated with a bank identification number (BIN) that uniquely identifies the issuer institution.

As used herein, the terms "payment token" or "token" may refer to an identifier that is used as a substitute or replacement identifier for an account identifier, such as a PAN. Tokens may be associated with a PAN or other account identifiers in at least one data structures (e.g., at least one databases and/or the like) such that they can be used to conduct a transaction (e.g., a payment transaction) without directly using the account identifier, such as a PAN. In some examples, an account identifier, such as a PAN, may be associated with a plurality of tokens for different individuals, different uses, and/or different purposes. For example, a payment token may include a series of numeric and/or alphanumeric characters that may be used as a substitute for an original account identifier. For example, a payment token "4900 0000 0000 0001" may be used in place of a PAN "4147 0900 0000 1234." In some non-limiting embodiments, a payment token may be "format preserving" and may have a numeric format that conforms to the account identifiers used in existing payment processing networks (e.g., ISO 8583 financial transaction message format). In some non-limiting embodiments, a payment token may be used in place of a PAN to initiate, authorize, settle, or resolve a payment transaction or represent the original credential in other systems where the original credential would typically be provided. In some non-limiting embodiments, a token value may be generated such that the recovery of the original PAN or other account identifier from the token value may not be computationally derived (e.g., with a one-way hash or other cryptographic function). Further, in some non-limiting embodiments, the token format may be configured to allow the entity receiving the payment token to identify it as a payment token and recognize the entity that issued the token.

As used herein, the term "provisioning" may refer to a process of enabling a device to use a resource or service. For example, provisioning may involve enabling a device to perform transactions using an account. Additionally or alternatively, provisioning may include adding provisioning data associated with account data (e.g., a payment token representing an account number) to a device.

As used herein, the term "token requestor" may refer to an entity that is seeking to implement tokenization according to embodiments of the presently disclosed subject matter. For example, the token requestor may initiate a request that a PAN be tokenized by submitting a token request message to a token service provider. Additionally or alternatively, a token requestor may no longer need to store a PAN associated with a token once the requestor has received the payment token in response to a token request message. In some non-limiting embodiments, the requestor may be an application, a device, a process, or a system that is configured to perform actions associated with tokens. For example, a requestor may request registration with a network token system, request token generation, token activation, token de-activation, token exchange, other token lifecycle management related processes, and/or any other token related processes. In some non-limiting embodiments, a requestor may interface with a network token system through any suitable communication network and/or protocol (e.g., using HTTPS, SOAP and/or an XML interface among others). For example, a token requestor may include card-on-file merchants, acquirers, acquirer processors, payment gateways acting on behalf of merchants, payment enablers (e.g., original equipment manufacturers, mobile network operators, and/or the like), digital wallet providers, issuers, third-party wallet providers, payment processing networks, and/or the like. In some non-limiting embodiments, a token requestor may request tokens for multiple domains and/or channels. Additionally or alternatively, a token requestor may be registered and identified uniquely by the token service provider within the tokenization ecosystem. For example, during token requestor registration, the token service provider may formally process a token requestor's application to participate in the token service system. In some non-limiting embodiments, the token service provider may collect information pertaining to the nature of the requestor and relevant use of tokens to validate and formally approve the token requestor and establish appropriate domain restriction controls. Additionally or alternatively, successfully registered token requestors may be assigned a token requestor identifier that may also be entered and maintained within the token vault. In some non-limiting embodiments, token requestor identifiers may be revoked and/or token requestors may be assigned new token requestor identifiers. In some non-limiting embodiments, this information may be subject to reporting and audit by the token service provider.

As used herein, the term a "token service provider" may refer to an entity including at least one server computers in a token service system that generates, processes and maintains payment tokens. For example, the token service provider may include or be in communication with a token vault where the generated tokens are stored. Additionally or alternatively, the token vault may maintain one-to-one mapping between a token and a PAN represented by the token. In some non-limiting embodiments, the token service provider may have the ability to set aside licensed BINs as token BINs to issue tokens for the PANs that may be submitted to the token service provider. In some non-limiting embodiments, various entities of a tokenization ecosystem may assume the roles of the token service provider. For example, payment networks and issuers or their agents may become the token service provider by implementing the token services according to non-limiting embodiments of the presently disclosed subject matter. Additionally or alternatively, a token service provider may provide reports or data output to reporting tools regarding approved, pending, or declined token requests, including any assigned token requestor ID. The token service provider may provide data output related to token-based transactions to reporting tools and applications and present the token and/or PAN as appropriate in the reporting output. In some non-limiting embodiments, the EMVCo standards organization may publish specifications defining how tokenized systems may operate. For example, such specifications may be informative, but they are not intended to be limiting upon any of the presently disclosed subject matter.

As used herein, the term "token vault" may refer to a repository that maintains established token-to-PAN mappings. For example, the token vault may also maintain other attributes of the token requestor that may be determined at the time of registration and/or that may be used by the token service provider to apply domain restrictions or other controls during transaction processing. In some non-limiting embodiments, the token vault may be a part of a token service system. For example, the token vault may be provided as a part of the token service provider. Additionally or alternatively, the token vault may be a remote repository accessible by the token service provider. In some non-limiting embodiments, token vaults, due to the sensitive nature of the data mappings that are stored and managed therein, may be protected by strong underlying physical and logical security. Additionally or alternatively, a token vault may be operated by any suitable entity, including a payment network, an issuer, clearing houses, other financial institutions, transaction service providers, and/or the like.

As used herein, the term "merchant" may refer to at least one entities (e.g., operators of retail businesses that provide goods and/or services, and/or access to goods and/or services, to a user (e.g., a customer, a consumer, a customer of the merchant, and/or the like) based on a transaction (e.g., a payment transaction)). As used herein, the term "merchant system" may refer to at least one computer systems operated by or on behalf of a merchant, such as a server computer executing at least one software applications. As used herein, the term "product" may refer to at least one goods and/or services offered by a merchant.

As used herein, the term "point-of-sale (POS) device" may refer to at least one devices, which may be used by a merchant to initiate transactions (e.g., a payment transaction), engage in transactions, and/or process transactions.

For example, a POS device may include at least one computers, peripheral devices, card readers, near-field communication (NFC) receivers, radio frequency identification (RFID) receivers, and/or other contactless transceivers or receivers, contact-based receivers, payment terminals, computers, servers, input devices, and/or the like.

As used herein, the term "point-of-sale (POS) system" may refer to at least one computers and/or peripheral devices used by a merchant to conduct a transaction. For example, a POS system may include at least one POS devices and/or other like devices that may be used to conduct a payment transaction. A POS system (e.g., a merchant POS system) may also include at least one server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and the issuer institution. In some non-limiting embodiments, a transaction service provider may include a credit card company, a debit card company, and/or the like. As used herein, the term "transaction service provider system" may also refer to at least one computer systems operated by or on behalf of a transaction service provider, such as a transaction processing server executing at least one software applications. A transaction processing server may include at least one processors and, in some non-limiting embodiments, may be operated by or on behalf of a transaction service provider.

As used herein, the term "acquirer" may refer to an entity licensed by the transaction service provider and approved by the transaction service provider to originate transactions (e.g., payment transactions) using a payment device associated with the transaction service provider. As used herein, the term "acquirer system" may also refer to at least one computer systems, computer devices, and/or the like operated by or on behalf of an acquirer. The transactions the acquirer may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions using a payment device of the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure that proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by an acquirer's payment facilitators, and/or the like. In some non-limiting embodiments, an acquirer may be a financial institution, such as a bank.

As used herein, the terms "electronic wallet," "electronic wallet mobile application," and "digital wallet" may refer to at least one electronic devices and/or at least one software applications configured to initiate and/or conduct transactions (e.g., payment transactions, electronic payment transactions, and/or the like). For example, an electronic wallet may include a user device (e.g., a mobile device) executing an application program and server-side software and/or databases for maintaining and providing transaction data to the user device. As used herein, the term "electronic wallet provider" may include an entity that provides and/or maintains an electronic wallet and/or an electronic wallet mobile application for a user (e.g., a customer). Examples of an electronic wallet provider include, but are not limited to, Google Pay®, Android Pay®, Apple Pay®, and Samsung Pay®. In some non-limiting examples, a financial institution (e.g., an issuer institution) may be an electronic wallet provider. As used herein, the term "electronic wallet provider system" may refer to at least one computer systems, computer devices, servers, groups of servers, and/or the like operated by or on behalf of an electronic wallet provider.

As used herein, the term "payment device" may refer to a payment card (e.g., a credit or debit card), a gift card, a smartcard, smart media, a payroll card, a healthcare card, a wrist band, a machine-readable medium containing account information, a keychain device or fob, an RFID transponder, a retailer discount or loyalty card, a cellular phone, an electronic wallet mobile application, a personal digital assistant (PDA), a pager, a security card, a computer, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to at least one merchants. The payment services may be associated with the use of payment devices managed by a transaction service provider. As used herein, the term "payment gateway system" may refer to at least one computer systems, computer devices, servers, groups of servers, and/or the like operated by or on behalf of a payment gateway and/or to a payment gateway itself. As used herein, the term "payment gateway mobile application" may refer to at least one electronic devices and/or at least one software applications configured to provide payment services for transactions (e.g., payment transactions, electronic payment transactions, and/or the like).

As used herein, the terms "client" and "client device" may refer to at least one client-side devices or systems (e.g., remote from a transaction service provider) used to initiate or facilitate a transaction (e.g., a payment transaction). As an example, a "client device" may refer to at least one POS devices used by a merchant, at least one acquirer host computers used by an acquirer, at least one mobile devices used by a user, and/or the like. In some non-limiting embodiments, a client device may be an electronic device configured to communicate with at least one networks and initiate or facilitate transactions. For example, a client device may include at least one computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "server" may refer to at least one computing devices (e.g., processors, storage devices, similar computer components, and/or the like) that communicate with client devices and/or other computing devices over a network (e.g., a public network, the Internet, a private network, and/or the like) and, in some examples, facilitate communication among other servers and/or client devices. It will be appreciated that various other arrangements are possible. As used herein, the term "system" may refer to at least one computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different server or processor, and/or a combination of servers and/or processors. For example, as used in the specification and the claims, a first server or a first processor that is recited as performing a first step or a first function may refer to the same or different server or the same or different processor recited as performing a second step or a second function.

Non-limiting embodiments of the disclosed subject matter are directed to methods, systems, and computer program products for preventing transmission of malicious data. Methods described herein may include, for example, receiving transaction data comprising at least one packet associated with a payment transaction; extracting at least one of network layer data or transport layer data from a header of the at least one packet; determining a first probability indicating that the at least one packet is in a first class based on the at least one of the network layer data or the transport layer data using a classifier; determining a second probability indicating that the at least one packet is in a second class based on the at least one of the network layer data or the transport layer data using the classifier; and blocking the at least one packet.

Such embodiments provide techniques and systems that prevent the transmission of malicious data. As a result, later-received data associated with non-fraudulent payment transactions may avoid being put into a queue to be processed by the fraud detection systems, thereby reducing the amount of time associated with determining whether to authorize the payment transactions. Additionally or alternatively, the systems that receive the malicious data may conserve computing resources that may otherwise be diverted to identify malicious data and/or malicious data traffic.

For the purpose of illustration, in the following description, while the presently disclosed subject matter is described with respect to systems, methods, and computer program products for preventing transmission of malicious data, e.g., based on a trained classifier, one skilled in the art will recognize that the disclosed subject matter is not limited to the illustrative embodiments. For example, the methods, systems, and computer program products described herein may be used with a wide variety of settings, such as for preventing transmission of malicious data in any suitable setting, e.g., card-present payment transactions (e.g., via a POS system at a location of a merchant), online payment transactions (e.g., via a website of a merchant on the Internet), interactions with electronic content (e.g., via a website, a search engine, a mobile application, and/or the like), and/or the like.

Referring now to FIG. 1, FIG. 1 is a diagram of a non-limiting embodiment of an environment 100 in which systems, products, and/or methods, as described herein, may be implemented. As shown in FIG. 1, environment 100 may include transaction service provider system 102, issuer system 104, user device 106, merchant system 108, acquirer system 110, and network 112.

Transaction service provider system 102 may include at least one devices capable of being in communication with issuer system 104, user device 106, merchant system 108, and/or acquirer system 110 via network 112. For example, transaction service provider system 102 may include a computing device (e.g., a server, a group of servers, and/or other like devices). In some non-limiting embodiments or aspects, transaction service provider system 102 may be associated with a transaction service provider as described herein. In some non-limiting embodiments, transaction service provider system 102 may be capable of being in communication with a data storage device, which may be local or remote to transaction service provider system 102. In some non-limiting embodiments, transaction service provider system 102 may be capable of receiving data from, storing data in, transmitting data to, or searching data stored in the data storage device. In some non-limiting embodiments or aspects, transaction service provider system 102 may include at least one components implemented by transaction service provider system 102 such as first firewall 102-a, second firewall 102-b, application layer 102-c, fraud detection system 102-d, and/or classifier 102-e. In some non-limiting embodiments or aspects, first firewall 102-a may be configured to analyze and block data (e.g., at least one messages, packets, and/or the like) that are malicious at layers three and/or four of the open systems interconnection (OSI) model. In some non-limiting embodiments or aspects, second firewall 102-b may be configured to analyze and block data (e.g., at least one messages, packets, and/or the like) that are malicious at layers three through seven of the OSI model. In some non-limiting embodiments or aspects, application layer 102-c may be configured to analyze and block data that is malicious based on information represented as input in data included in the at least one packets (e.g., data associated with a PAN, an email address, a phone number, a representation of a user's fingerprint, a user identifier, and/or the like). In some non-limiting embodiments or aspects, application layer 102-c may decrypt data included in the at least one packets prior to analyzing and blocking the data. In some non-limiting embodiments or aspects, fraud detection system 102-d may analyze and block data that is malicious based on determining a score (e.g., a risk score, described herein) for the data. The score may be determined based on data included in the at least one packets. In some non-limiting embodiments or aspects, classifier 102-e may be configured to determine one or more probabilities (e.g., a first probability, a second probability, a third probability, a fourth probability, a fifth probability, and/or the like).

Issuer system 104 may include at least one devices capable of being in communication with transaction service provider system 102, user device 106, merchant system 108, and/or acquirer system 110 via network 112. For example, issuer system 104 may include at least one computing device (e.g., a server, a group of servers, and/or other like devices). In some non-limiting embodiments or aspects, issuer system 104 may be associated with an issuer institution that issued a payment account and/or instrument (e.g., a credit account, a debit account, a credit card, a debit card, and/or the like) to a user (e.g., a user associated with user device 106 and/or the like).

User device 106 may include at least one devices capable of being in communication with issuer system 104, merchant system 108, and/or acquirer system 110 via network 114. For example, user device 106 may include a computing device such as a client device and/or the like. User device 106 may be configured to transmit and/or receive data to and/or from merchant system 108 via an imaging system and/or a short-range wireless communication connection (e.g., an NFC communication connection, an RFID communication connection, a Bluetooth® communication connection, and/or the like). In some non-limiting embodiments or aspects, user device 106 may be associated with a user (e.g., an individual operating a device).

Merchant system 108 may include a device capable of being in communication with transaction service provider system 102, issuer system 104, user device 106, and/or acquirer system 110 via network 112. For example, merchant system 108 may include at least one computing devices (e.g., a server, a group of servers, a client device, a group of client devices, and/or other like devices). Merchant system 108 may be configured to transmit and/or receive data to and/or from user device 106 via an imaging system and/or a short-range wireless communication connection. In some non-limiting embodiments or aspects, merchant system 108 may include a point-of-sale (POS) device. In some non-limiting embodiments or aspects, merchant system 108 may be associated with a merchant as described herein.

Acquirer system 110 may include at least one devices capable of being in communication with transaction service provider system 102, issuer system 104, user device 106, merchant system 108, and/or acquirer system 110 via network 112. For example, acquirer system 110 may include a computing device (e.g., a server, a group of servers, and/or other like devices). In some non-limiting embodiments or aspects, acquirer system 110 may be associated with an acquirer as described herein.

Network 112 may include at least one wired and/or wireless networks. For example, network 112 may include a cellular network (e.g., a long-term evolution (LTE) network, a third generation (3G) network, a fourth generation (4G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., at least one systems) or a set of devices (e.g., at least one devices) of environment 100 may perform at least one functions described as being performed by another set of systems or another set of devices of environment 100.

Figure 2:
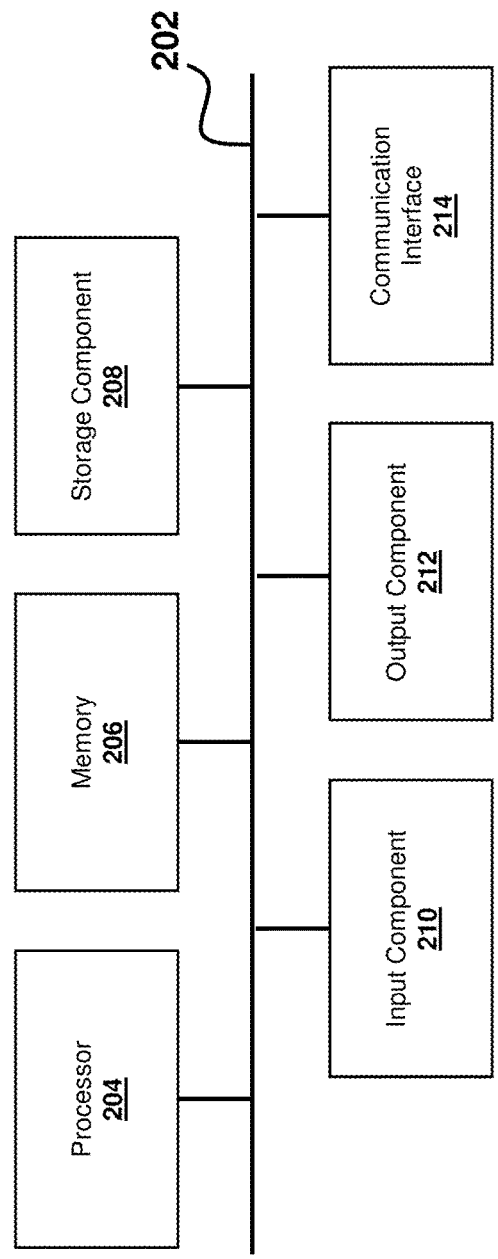
FIG. 2 is a diagram of a non-limiting embodiment of one or more devices and/or one or more systems of FIG. 1.

Referring now to FIG. 2, FIG. 2 is a diagram of example components of a device 200. Device 200 may correspond to at least one device of transaction service provider system 102, one or more components of transaction service provider system 102 (e.g., first firewall 102-*a*, second firewall 102-*b*, application layer 102-*c*, fraud detection system 102-*d*, and/or classifier 102-*e*), issuer system 104, user device 106, merchant system 108, acquirer system 108, and/or network 112. In some non-limiting embodiments, transaction service provider system 102, one or more components of transaction service provider system 102 (e.g., first firewall 102-*a*, second firewall 102-*b*, application layer 102-*c*, fraud detection system 102-*d*, and/or classifier 102-*e*), issuer system 104, user device 106, merchant system 108, acquirer system 108, and/or network 112 may include at least one device 200 and/or at least one component of device 200. As shown in FIG. 2, device 200 may include bus 202, processor 204, memory 206, storage component 208, input component(s) 210, output component(s) 212, and communication interface 214.

Bus 202 may include a component that permits communication among the components of device 200. In some non-limiting embodiments, processor 204 may be implemented in hardware, software, or a combination of hardware and software. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component(s) 210 may include a component that permits device 200 to receive information, such as via user input (e.g., a touch screen display, a keyboard, a keypad, a mouse, a button, a switch, a microphone, a camera, and/or the like). Additionally or alternatively, input component(s) 210 may include a sensor for sensing information (e.g., a global positioning system (GPS) component, an accelerometer, a gyroscope, an actuator, and/or the like). Output component(s) 212 may include a component that provides output information from device 200 (e.g., a display, a speaker, at least one light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a WiFi® interface, a Bluetooth® interface, a Zigbee® interface, a cellular network interface, and/or the like.

Device 200 may perform at least one processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform at least one processes described herein. Additionally or alternatively, hardwired circuitry may be used in place of or in combination with software instructions to perform at least one processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., at least one components) of device 200 may perform at least one functions described as being performed by another set of components of device 200.

Figure 3:
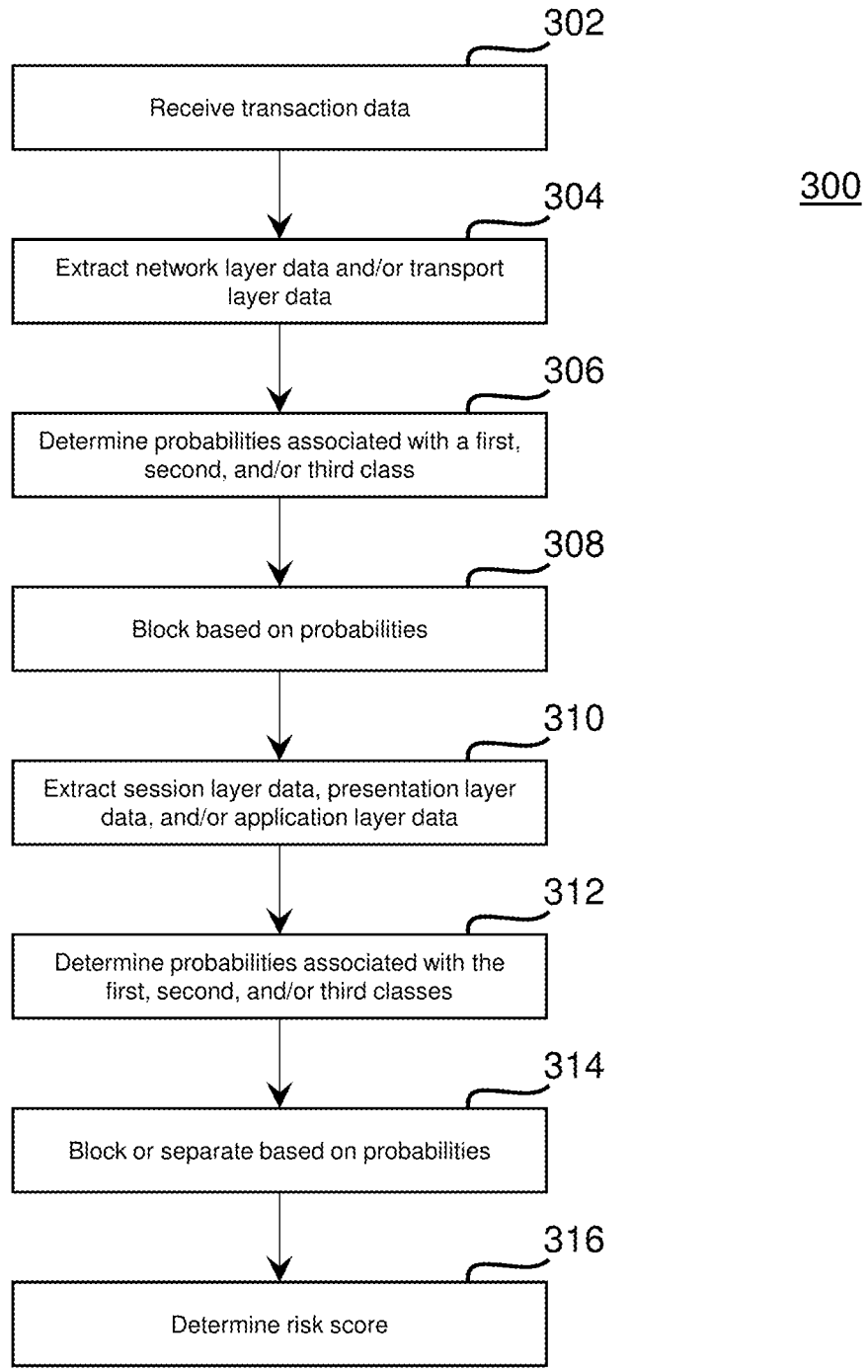
FIG. 3 is a flowchart of a non-limiting embodiment of a process for preventing transmission of malicious data, according to the principles of the presently disclosed subject matter.

Referring now to FIG. 3, FIG. 3 is a flowchart of a non-limiting embodiment of a process 300 for preventing transmission of malicious data. In some non-limiting embodiments, at least one of the steps of process 300 may be performed (e.g., completely, partially, and/or the like) by transaction service provider system 102. In some non-limiting embodiments, at least one of the steps of process 300 may be performed (e.g., completely, partially, and/or the like) by another system, another device, another group of systems, or another group of devices, separate from or including transaction service provider system 102, such as issuer system 104 (e.g., at least one devices of issuer system 104), user device 106, merchant system 108 (e.g., at least one devices of merchant system 108), acquirer system 110 (e.g., at least one devices of acquirer system 110), and/or the like. In some non-limiting embodiments or aspects, at least one of the steps of process 300 may be performed (e.g., completely, partially, and/or the like) by at least one components implemented by transaction service provider system 102 such as, for example, first firewall 102-a, second firewall 102-b, application layer 102-c, fraud detection system 102-d, and/or classifier 102-e.

As shown in FIG. 3, at step 302, process 300 may include receiving transaction data. For example, transaction service provider system 102 may receive transaction data from acquirer system 110. The transaction data may be for a payment transaction involving a user associated with user device 106 and a merchant associated with merchant system 108. In another example, transaction service provider system 102 may receive the transaction data from issuer system 104, merchant system 108, a payment gateway system associated with a payment gateway described herein, and/or other like systems involved in processing the payment transaction. In some non-limiting embodiments or aspects, transaction service provider system 102 may receive a message including data as described herein. For example, transaction service provider system 102 may receive a message (e.g., an authorization request message) including transaction data. In such an example, the transaction data may include at least one packet, as described herein.

In some non-limiting embodiments or aspects, the transaction data may comprise at least one packet associated with a payment transaction. Additionally or alternatively, the transaction data may comprise a plurality of packets associated with at least one payment transactions. For example, the at least one payment transactions may correspond to at least one of the packets of the plurality of packets included in the transaction data. In some non-limiting embodiments or aspects, the at least one packet included in the transaction data may include a header (e.g., a hypertext transfer protocol (HTTP) header, and/or the like). For example, the at least one packet included in the transaction data may include a header, the header including data such as, for example, network layer data (e.g., data associated with a network layer) and/or transport layer data (e.g., data associated with a transport layer). Additionally or alternatively, the at least one packet included in the transaction data may include at least one of session layer data (e.g., data associated with a session), presentation layer data (e.g., data associated with formatting and delivering information to an application layer for further processing and display), and/or application layer data (e.g., data associated with an application layer that specifies shared communications protocols and interface methods used by hosts in a network).

As shown in FIG. 3, at step 304, process 300 may include extracting network layer data and/or transport layer data. For example, transaction service provider system 102 may extract network layer data and/or transport layer data from the at least one packet included in the transaction data. In such an example, transaction service provider system 102 may extract the network layer data and/or the transport layer data from the header of the at least one packet included in the transaction data. In some non-limiting embodiments or aspects, transaction service provider system 102 may extract the network layer data and/or the transport layer data based on transaction service provider system 102 receiving the transaction data.

As shown in FIG. 3, at step 306, process 300 may include determining probabilities associated with a first, second, and/or third class. For example, transaction service provider system 102 may determine a first probability that indicates the at least one packet is associated with a first class, the first class associated with packets that should be blocked from further transmission (e.g., from further transmission between one or more components implemented included in transaction service provider system 102 and/or from transaction service provider system 102 to at least one other systems such as, for example, issuer system 104 and/or the like). Transaction service provider system 102 may determine a second probability that indicates the at least one packet is associated with a second class, the second class associated with packets that should be permitted to be transmitted (e.g., to be permitted to be transmitted between one or more components implemented in transaction service provider system 102 and/or from transaction service provider system 102 to at least one other systems such as, for example, issuer system 104 and/or the like). Transaction service provider system 102 may determine a fifth probability that indicates the at least one packet is associated with a third class, the third class associated with packets that should be further analyzed prior to further transmission (e.g., from further transmission between one or more components implemented in transaction service provider system 102 and/or from transaction service provider system 102 to at least one other systems such as, for example, issuer system 104 and/or the like).

In some non-limiting embodiments or aspects, transaction service provider system 102 may determine the first probability, the second probability, and/or the fifth probability based on data extracted from the header of the at least one packet. For example, transaction service provider system 102 may determine the first probability, the second probability, and/or the fifth probability based on at least one of the network layer data or the transport layer data. Additionally or alternatively, transaction service provider system 102 may determine the first probability, the second probability, and/or the fifth probability based on data extracted by transaction service provider system 102 from the at least one packet. For example, transaction service provider system 102 may determine the first probability, the second probability, and/or the fifth probability based on at least one of the session layer data, the presentation layer data, or application layer data in addition to, or in the alternative to, at least one of the network layer data and/or the transport layer data. In some non-limiting embodiments or aspects, transaction service provider system 102 may determine the first probability, the second probability, and/or the fifth probability based on transaction service provider system 102 receiving the transaction data at a component of transaction service provider system 102 (e.g., first firewall 102-a, second firewall 102-b, application layer 102-c, fraud detection system 102-d, classifier 102-e, and/or the like).

In some non-limiting embodiments or aspects, transaction service provider system 102 may determine the first probability, the second probability, and/or the fifth probability using classifier 102-e. For example, transaction service provider system 102 may determine the first probability, the second probability, and/or the fifth probability using classifier 102-e based on transaction service provider system 102 causing data extracted from the transaction data (e.g., at least one of the network layer data, the transport layer data, the session layer data, the presentation layer data, and/or the application layer data) to be provided to classifier 102-e. In such an example, transaction service provider system 102 may cause at least one component of transaction service provider system 102 to provide the data extracted from the transaction data to classifier 102-e to cause the classifier to determine the first probability, the second probability, and/or the fifth probability based on (e.g., in response to) the at least one component receiving the data extracted from the transaction data. The at least one component of transaction service provider system 102 may then receive the first probability, the second probability, and/or the fifth probability from classifier 102-e. Transaction service provider system 102 may determine that the first probability, the second probability, and/or the fifth probability corresponds to the transaction data and/or to at least one packets included in the transaction data based on transaction service provider system 102 determining that the data extracted from the transaction data and provided to classifier 102-e corresponds to the transaction data and/or to at least one packets included in the transaction data.

In some non-limiting embodiments or aspects, transaction service provider system 102 may train classifier 102-e. For example, transaction service provider system 102 may execute a supervised learning algorithm based on transaction data associated with malicious network traffic and transaction data associated with non-malicious network traffic. As a result, after being trained, classifier 102-e may then receive transaction data and make at least one predictions (e.g., determine at least one probabilities described herein). The predictions may then be transmitted to at least one components of transaction service provider system 102 requesting the predictions.

In some non-limiting embodiments or aspects, transaction service provider system 102 may compare the first probability, the second probability, and/or the fifth probability. For example, transaction service provider system 102 may compare the first probability, the second probability, and/or the fifth probability and transaction service provider system 102 may determine whether the first probability, the second probability, or the fifth probability is greater than or not greater than the other probability or probabilities. In such an example, transaction service provider system 102 may compare the first probability to the second probability and transaction service provider system 102 may determine that the first probability is greater than or not greater than the second probability based on the comparison. In another example, transaction service provider system 102 may compare the first probability and/or the second probability to the fifth probability and transaction service provider system 102 may determine that the fifth probability is greater than or not greater than the first probability and/or the second probability based on the comparison.

In some non-limiting embodiments or aspects, transaction service provider system 102 may determine that the transaction data is associated with the first class, the second class, and/or the third class. For example, transaction service provider system 102 may determine that the transaction data and/or at least one packets included in the transaction data are associated with the first class based on transaction service provider system 102 determining that the first probability is greater than the second probability and/or the fifth probability. In another example, transaction service provider system 102 may determine that the transaction data and/or that at least one packets included in the transaction data are associated with the second class based on transaction service provider system 102 determining that the second probability is greater than the first probability and/or the fifth probability. In another example, transaction service provider system 102 may determine that the transaction data and/or that at least one packets included in the transaction data are associated with the third class based on transaction service provider system 102 determining that the fifth probability is greater than the first probability and/or the second probability.

As shown in FIG. 3, at step 308, process 300 may include blocking based on probabilities. For example, transaction service provider system 102 may block transmission of the transaction data and/or at least one packets included in the transaction data based on transaction service provider system 102 determining that the first probability is greater than the second probability and/or the fifth probability. In such an example, transaction service provider system 102 may determine that the transaction data and/or at least one packets included in the transaction data are associated with the first class based on the first probability, the second probability, and/or the fifth probability and transaction service provider system 102 may block transmission of the at least one packets included in the transaction data that are associated with the first class. In some non-limiting embodiments or aspects, transaction service provider system 102 may forego blocking the transaction data and/or at least one packets included in the transaction data. For example, transaction service provider system 102 may forego blocking the transaction data and/or at least one packets included in the transaction data based on transaction service provider system 102 determining that that the transaction data is associated with the second class and/or the third class.

As shown in FIG. 3, at step 310, process 300 may include extracting session layer data, presentation layer data, and/or application layer data. For example, transaction service provider system 102 may extract session layer data, presentation layer data, and/or application layer data from the at least one packet included in the transaction data. In some non-limiting embodiments or aspects, transaction service provider system 102 may extract the session layer data, presentation layer data, and/or application layer data based on (e.g., in response to and/or after) transaction service provider system 102 determining that the transaction data and/or the at least one packets included in the transaction data are associated with the second class and/or the third class.

As shown in FIG. 3, at step 312, process 300 may include determining probabilities associated with the first, second, and/or third classes. For example, transaction service provider system 102 may determine the third probability, the fourth probability, and/or the fifth probability based on data extracted from the transaction data. In some non-limiting embodiments or aspects, transaction service provider system 102 may determine the third probability, the fourth probability, and/or the fifth probability based on at least one of the session layer data, the presentation layer data, and/or the application layer data. Additionally or alternatively, transaction service provider system 102 may determine the third probability, the fourth probability, and/or the fifth probability based on data extracted by transaction service provider system 102 from the header of the at least one packet. For example, transaction service provider system 102 may determine the third probability, the fourth probability, and/or the fifth probability based on at least one of the network layer data and/or the transport layer data in addition to, and/or in the alternative to, at least one of the session layer data, the presentation layer data, and/or the application layer data. In some non-limiting embodiments or aspects, transaction service provider system 102 may determine the third probability, the fourth probability, and/or the fifth probability based on transaction service provider system 102 receiving the transaction data. In such an example, transaction service provider system 102 may cause at least one components of transaction service provider system 102 to determine the third probability, the fourth probability, and/or the fifth probability based on transaction service provider system 102 receiving the transaction data at second firewall 102-b.

In some non-limiting embodiments or aspects, transaction service provider system 102 may determine the third probability, the fourth probability, and/or the fifth probability using classifier 102-e. For example, transaction service provider system 102 may determine the third probability, the fourth probability, and/or the fifth probability using classifier 102-e based on transaction service provider system 102 causing data extracted from the transaction data (e.g., at least one of the network layer data, the transport layer data, the session layer data, the presentation layer data, and/or the application layer data) to be provided to classifier 102-e. In such an example, transaction service provider system 102 may cause at least one components of transaction service provider system 102 to provide the data extracted from the transaction data to classifier 102-e to cause classifier 102-e to determine the third probability, the fourth probability, and/or the fifth probability based on (e.g., in response to) the at least one components receiving the data extracted from the transaction data. The at least one components of transaction service provider system 102 may then receive the third probability, the fourth probability, and/or the fifth probability from classifier 102-e. Transaction service provider system 102 may determine that the third probability, the fourth probability, and/or the fifth probability corresponds to the transaction data and/or to at least one packets included in the transaction data based on transaction service provider system 102 determining that the data extracted from the transaction data and provided to classifier 102-e corresponds to the transaction data and/or to at least one packets included in the transaction data.

In some non-limiting embodiments or aspects, transaction service provider system 102 may compare the third probability, the fourth probability, and/or the fifth probability. For example, transaction service provider system 102 may compare the third probability, the fourth probability, and/or the fifth probability and transaction service provider system 102 may determine whether the third probability, the fourth probability, or the fifth probability is greater than or not greater than the other probability or probabilities. In such an example, transaction service provider system 102 compare the third probability to the fourth probability and transaction service provider system 102 may determine that the third probability is greater than or not greater than the fourth probability based on the comparison. In another example, transaction service provider system 102 may compare the third probability and/or the fourth probability to the fifth probability and transaction service provider system 102 may determine that the fifth probability is greater than or not greater than the first probability and/or the second probability based on the comparison.

In some non-limiting embodiments or aspects, transaction service provider system 102 may determine that the transaction data is associated with the first class, the second class, and/or the third class. For example, transaction service provider system 102 may determine that the transaction data and/or at least one packets included in the transaction data are associated with the first class based on transaction service provider system 102 determining that the third probability is greater than the fourth probability and/or the fifth probability. In such an example, as shown in FIG. 3 at step 314, transaction service provider system 102 may block or separate based on probabilities (e.g., transaction service provider system 102 may block the transaction data and/or one or more packets included in the transaction data from being transmitted). In another example, transaction service provider system 102 may determine that the transaction data and/or that at least one packets included in the transaction data are associated with the second class based on transaction service provider system 102 determining that the fourth probability is greater than the third probability and/or the fifth probability. In another example, transaction service provider system 102 may determine that the transaction data and/or that at least one packets included in the transaction data are associated with the third class based on transaction service provider system 102 determining that the fifth probability is greater than the third probability and/or the fourth probability.

As shown in FIG. 3, at step 316, process 300 may include determining a score (e.g., a risk score indicating the likelihood that the transaction data and/or at least one packets included in the transaction data are associated with at least one fraudulent payment transactions). For example, transaction service provider system 102 may determine the score based on the third probability, the fourth probability, and/or the fifth probability. In some non-limiting embodiments or aspects, transaction service provider system 102 may determine the score based on (e.g., in response to and/or after)

transaction service provider system 102 determining the third probability, the fourth probability, and/or the fifth probability. In some non-limiting embodiments or aspects, transaction service provider system 102 may add the score to the transaction data. For example, transaction service provider system 102 may include the score in a header of at least one packets included in the transaction data.

In some non-limiting embodiments or aspects, transaction service provider system 102 may cause a separate computing system and/or a computing system included in transaction service provider system 102 to confirm whether the transaction data and/or at least one packets included in the transaction data are associated with a fraudulent payment transaction. For example, transaction service provider system 102 may determine that the transaction data and/or at least one packets included in the transaction data are associated with the third class. In such an example, transaction service provider system 102 may transmit a message to a separate computing system and/or a computing system included in transaction service provider system 102 to confirm that the transaction data and/or that at least one packets included in the transaction data are not associated with a fraudulent payment transaction. In such an example, the separate computing system and/or a computing system included in transaction service provider system 102 may transmit a message to user device 106 to cause user device 106 to display a prompt for input indicating that the user associated with user device 106 is a human (e.g., not a robot and/or an automated system). The separate computing system and/or a computing system included in transaction service provider system 102 may receive the input from user device 106 and determine whether the transaction data and/or at least one packets included in the transaction data are associated with a fraudulent payment transaction based on the input received from user device 106. Where the separate computing system and/or a computing system included in transaction service provider system 102 determines that the transaction data and/or at least one packets included in the transaction data are associated with a fraudulent payment transaction, the separate computing system and/or the computing system included in transaction service provider system 102 may transmit a message to transaction service provider system 102 including an indication that the transaction data and/or at least one packets included in the transaction data are associated with a fraudulent payment transaction. Where the separate computing system and/or a computing system included in transaction service provider system 102 determines that the transaction data and/or at least one packets included in the transaction data are not associated with a fraudulent payment transaction, the separate computing system and/or the computing system included in transaction service provider system 102 may transmit a message to transaction service provider system 102 including an indication that the transaction data and/or at least one packets included in the transaction data are not associated with a fraudulent payment transaction Referring now to FIGS. 4A-4C, FIGS. 4A-4C are diagrams of an implementation 400 of a non-limiting embodiment relating to a process for preventing transmission of malicious data. In some non-limiting embodiments or aspects, the process may be the same as or similar to process 300 shown in FIG. 3. As shown in FIGS. 4A-4C, implementation 400 may include transaction service provider system 402 and acquirer system 410. In some non-limiting embodiments or aspects, transaction service provider system 402 may be the same as or similar to transaction service provider system 102. In some non-limiting embodiments or aspects, acquirer system 410 may be the same as or similar to acquirer system 110, issuer system 104, and/or merchant system 108.

As shown by reference number 415 in FIG. 4A, acquirer system 410 may transmit transaction data associated with a payment transaction to transaction service provider system 402. For example, acquirer system 410 may transmit transaction data associated with a payment transaction to transaction service provider system 402 based on (e.g., in response to) a user device (e.g., a user device that is the same as or similar to user device 106 of FIG. 1) communicating with a merchant system (e.g., a merchant system that is the same as or similar to merchant system 108) to initiate a payment transaction involving a user associated with the user device and a merchant associated with the merchant system. In such an example, the merchant system may communicate with acquirer system 410 to provide data associated with the payment transaction to be processed. Acquirer system 410 may then generate and/or transmit payment transaction data associated with the payment transaction to transaction service provider system 402.

As shown by reference number 420 in FIG. 4B, transaction service provider system 402 may determine whether the transaction data associated with the payment transaction is fraudulent transaction data associated with a fraudulent payment transaction. For example, transaction service provider system 402 may transmit at least one packets to first firewall 402-a, then from first firewall 402-a to second firewall 402-b, then from second firewall 402-b to application layer 402-c, then from application layer 402-c to fraud detection system 402-d. In such an example, transaction service provider system 402 may determine whether the transaction data associated with the payment transaction is fraudulent transaction data associated with a fraudulent payment transaction based on analyzing the transaction data associated with the payment transaction. In some non-limiting embodiments or aspects, transaction service provider system 402 may determine a score representing the likelihood that the transaction data associated with the payment transaction is fraudulent transaction data associated with a fraudulent payment transaction and, transaction service provider system 402 may compare the score to a fraudulent transaction score threshold. Transaction service provider system 402 may then determine that the transaction data associated with the payment transaction is fraudulent transaction data associated with a fraudulent payment transaction based on comparing the score to the fraudulent transaction score threshold.

In some non-limiting embodiments or aspects, transaction service provider system 402 may forego transmitting the transaction data associated with the payment transaction to at least one computing device. For example, transaction service provider system 402 may forego transmitting the transaction data associated with the payment transaction to at least one computing device based on transaction service provider system 402 determining that the transaction data associated with the payment transaction is fraudulent transaction data associated with a fraudulent payment transaction. In such an example, transaction service provider system 402 may forego transmitting the transaction data associated with the payment transaction to an issuer system (e.g., an issuer system that is the same as or similar to issuer system 104 of FIG. 1) based on transaction service provider system 402 determining that the transaction data associated with the payment transaction is fraudulent transaction data associated with a fraudulent payment transaction.

As shown by reference number 425 in FIG. 4C, transaction service provider system 402 may transmit transaction response data associated with the payment transaction to acquirer system 410. For example, transaction service provider system 402 may transmit the transaction response data associated with the payment transaction to acquirer system 410 to indicate that the transaction data associated with the payment transaction is fraudulent transaction data associated with a fraudulent payment transaction. In some non-limiting embodiments or aspects, transaction service provider system 402 may transmit the transaction response data associated with the payment transaction to an issuer system (e.g., an issuer system that is the same as or similar to issuer system 104) to indicate that the transaction data associated with the payment transaction is fraudulent transaction data associated with a fraudulent payment transaction.

Referring now to FIGS. 5A-5F, FIGS. 5A-5F are diagrams of an implementation 500 of a non-limiting embodiment relating to a process for preventing transmission of malicious data. In some non-limiting embodiments or aspects, the process may be the same as or similar to process 300 shown in FIG. 3. As shown in FIGS. 5A-5F, implementation 500 may include transaction service provider system 502, acquirer system 510, and computing system 514. In some non-limiting embodiments or aspects, transaction service provider system 502 may be the same as or similar to transaction service provider system 102 and/or transaction service provider system 402. In some non-limiting embodiments or aspects, acquirer system 510 may be the same as or similar to acquirer system 410, acquirer system 110, issuer system 104, and/or merchant system 108.

In some non-limiting embodiments or aspects, computing system 514 may be a computing system outside of a communication path for processing a payment transaction. For example, a communication path for processing a payment transaction may be associated with a network, the network including acquirer system 410 and transaction service provider system 402 in a communication path (e.g., a communication path, a communication channel, a communication network, and/or the like). As an example, the network included in the communication path may process (e.g., initiate, conduct, authorize, and/or the like) an electronic payment transaction via the communication path between acquirer system 410 and transaction service provider system 402. In some non-limiting embodiments or aspects, the network including acquirer system 410 and transaction service provider system 402 in the communication path may additionally and/or alternatively include an issuer system (e.g., an issuer system that is the same as or similar to issuer system 104), a user device (e.g., a user device that is the same as or similar to user device 106), a merchant system (e.g., a merchant system that is the same as or similar to merchant system 108) and/or other like systems described herein that may be involved in processing an electronic payment transaction.

As shown by reference number 515 in FIG. 5A, acquirer system 510 may transmit transaction data associated with a payment transaction to transaction service provider system 502. For example, acquirer system 510 may transmit transaction data associated with a payment transaction to transaction service provider system 502 based on (e.g., in response to) a user device (e.g., a user device that is the same as or similar to user device 106 of FIG. 1) communicating with a merchant system (e.g., a merchant system that is the same as or similar to merchant system 108) to initiate a payment transaction involving a user associated with the user device and a merchant associated with the merchant system. In such an example, the merchant system may communicate with acquirer system 510 to provide data associated with the payment transaction to be processed. Acquirer system 510 may then generate and/or transmit payment transaction data associated with the payment transaction to transaction service provider system 502.

Figure 5B:
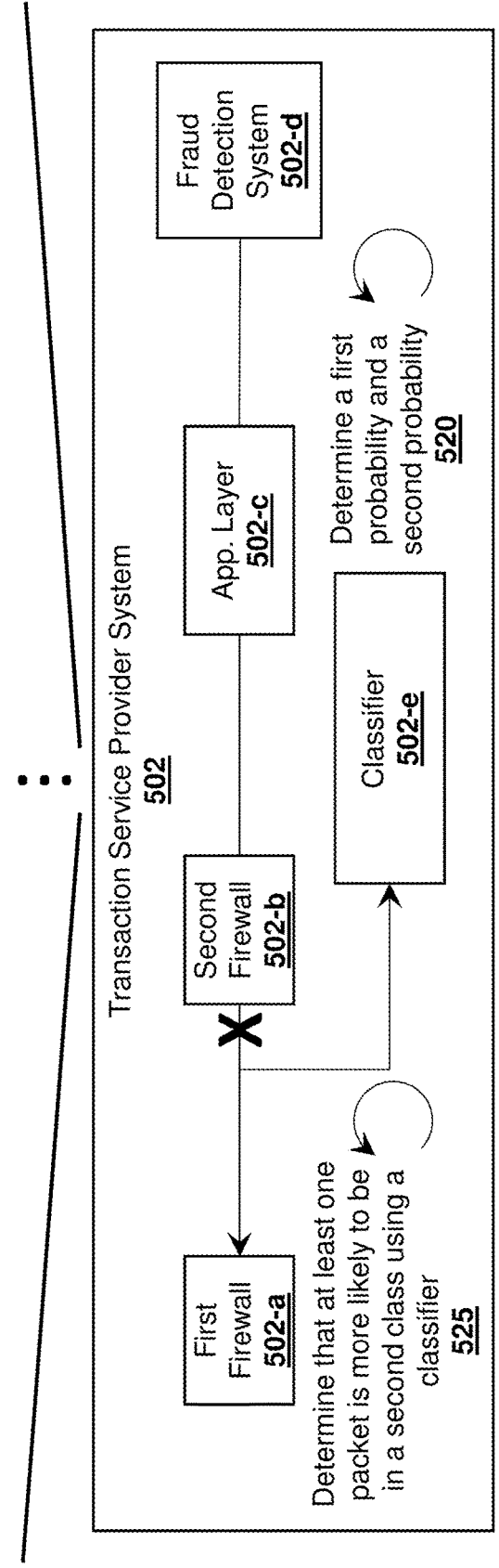
Figure 5C:
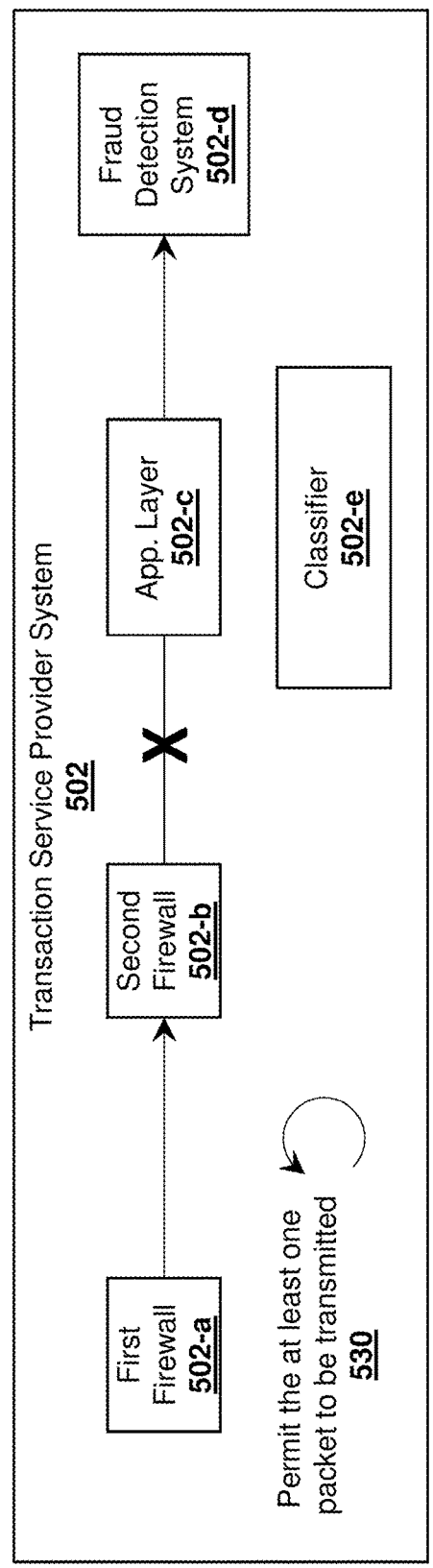

As shown by reference number 520 in FIG. 5B, transaction service provider system 502 may determine a first probability and a second probability using classifier 502-e. For example, transaction service provider system 502 may determine the first probability and the second probability based on transaction service provider system 502 receiving the transaction data associated with the payment transaction at first firewall 502-a. The first probability may represent a likelihood that at least one packet included in the transaction data is in a first class (e.g., a class of payment transactions associated with fraudulent payment transactions to be blocked). The second probability may represent a likelihood that the at least one packet included in the transaction data is in a second class (e.g., a class of payment transactions associated with non-fraudulent transactions). In such an example, transaction service provider system 502 may extract at least one of network layer data or transport layer data from a header of at least one packet included in the transaction data at first firewall 502-a. Transaction service provider system 502 may then transmit the at least one of network layer data or transport layer data to classifier 502-e to cause classifier 502-e to determine the first probability and the second probability based on the at least one of network layer data or transport layer data.

In some non-limiting embodiments or aspects, transaction service provider system 502 may derive data from the network layer data and/or the transport layer data as described herein and transaction service provider system 502 may provide the data derived from the network layer data and/or the transport layer data to classifier 502-e. Additionally or alternatively, classifier 502-e may derive data from the network layer data and/or the transport layer data as described herein. For example, transaction service provider system 502 may derive the data from the network layer data and/or the transport layer data by querying at least one database to derive the data from the network layer data and/or the transport layer data. In such an example, transaction service provider system 502 may derive data from the network layer data and/or the transport layer data that is associated with a history of total payment volume associated with an internet protocol (IP) address involved in a payment transaction initiated by a user device. The history may extend over a period of time (e.g., one week, one month, and/or the like). Transaction service provider system 502 may then derive Bayesian network values based on the data derived from the network layer data and/or the transport layer data. In some non-limiting embodiments or aspects, transaction service provider system 502 may derive data from the network layer data and/or the transport layer data that is associated with a history of malicious data originating from an IP address (e.g., transaction data associated with fraudulent payment transactions, and/or the like). For example, transaction service provider system 502 may provide an IP address (e.g., an IP address associated with a physical address, an IP address associated with an area (e.g., a town, a state, a country, and/or the like), and/or the like) to a database of IP addresses correlated to malicious data transmissions to query the database and receive from the database an indication of whether the IP address is blocked or not blocked. In some non-limiting embodiments or aspects, transaction service provider system 502 may derive data from the network layer data and/or the transport layer data that is associated with a history of authorization requests involving an IP address. For example, transaction service provider system 502 may query a database of IP addresses correlated to authorization requests and/or authorization responses and receive from the database an indication of whether an IP address is associated with a volume of authorization requests that exceeds a threshold (e.g., a predetermined threshold of authorization requests permitted within a time period). In some non-limiting embodiments or aspects, transaction service provider system 502 may determine whether an IP address was included on a blocklist (e.g., a list of IP addresses that payment transactions are not permitted to be initiated from). For example, transaction service provider system 502 may query a database of IP addresses correlated to blocked IP addresses (e.g., IP addresses associated with malicious traffic). The blocklist may be represented in a database maintained by transaction service provider system 502 and/or a database included in a different computing device (e.g., a database in at least one devices of FIG. 1). In some non-limiting embodiments or aspects, transaction service provider system 502 may derive data from the network layer data and/or the transport layer data that is associated with a threat intelligence risk score, the threat intelligence risk score associated with an indication as to whether an IP address is associated with spam messages and/or data, malicious messages and/or data, messages and/or data that cannot be attributed to a device (e.g., anonymous messages, anonymous data, and/or the like), phishing data and/or messages, and/or the like. In some non-limiting embodiments or aspects, transaction service provider system 502 may derive data from the network layer data and/or the transport layer data that is associated with the traffic associated with at least one application involved in processing the transaction data. For example, transaction service provider system 502 may determine whether at least one application is a critical application (e.g., an application that directly influences whether payment transactions are authorized or not authorized). Transaction service provider system 502 may then determine that a quantity of packets transmitted to the at least one applications exceeds a packet threshold (e.g., a threshold associated with an amount of packets that the application is configured to process within a period of time). In some non-limiting embodiments or aspects, transaction service provider system 502 may derive data from the network layer data and/or the transport layer data that is associated with passive fingerprinting (e.g., operating system fingerprinting) via TCP flags, time to live (TTL) tags, packet sizes, don't fragment (DF) flags, whether the data and/or at least one packets included in the data are masquerading to be from a different operating system, and/or the like. It will be understood that some and/or all of the data described as being derived from the network layer data and/or the transport layer data may additionally or alternatively be derived from session layer data, presentation layer data, or application layer data included in at least one packets, the at least one packets included in the transaction data. Additionally or alternatively, some and/or all of the data described as being derived from the session layer data, the presentation layer data, and/or the application layer data included in at least one packets may be derived from the network layer data and/or the transport layer data.

As shown by reference number 525 in FIG. 5B, transaction service provider system 502 may determine that the at least one packet is more likely to be in a second class using classifier 502-*e*. For example, transaction service provider system 502 may determine that the at least one packet is more likely to be in the second class rather than the first class based on transaction service provider system 502 receiving the first probability and the second probability from classifier 502-*e*. In such an example, transaction service provider system 502 may compare the first probability and the second probability at first firewall 502-*a*. Where transaction service provider system 502 determines that the first probability is greater than the second probability, transaction service provider system 502 may cause first firewall 502-*a* to block the at least one packet. Alternatively, where transaction service provider system 502 determines that the first probability is not greater than the second probability, as shown by reference number 530 in FIG. 5C, transaction service provider system 502 may permit first firewall 502-*a* to transmit the at least one packet.

Figure 5D:
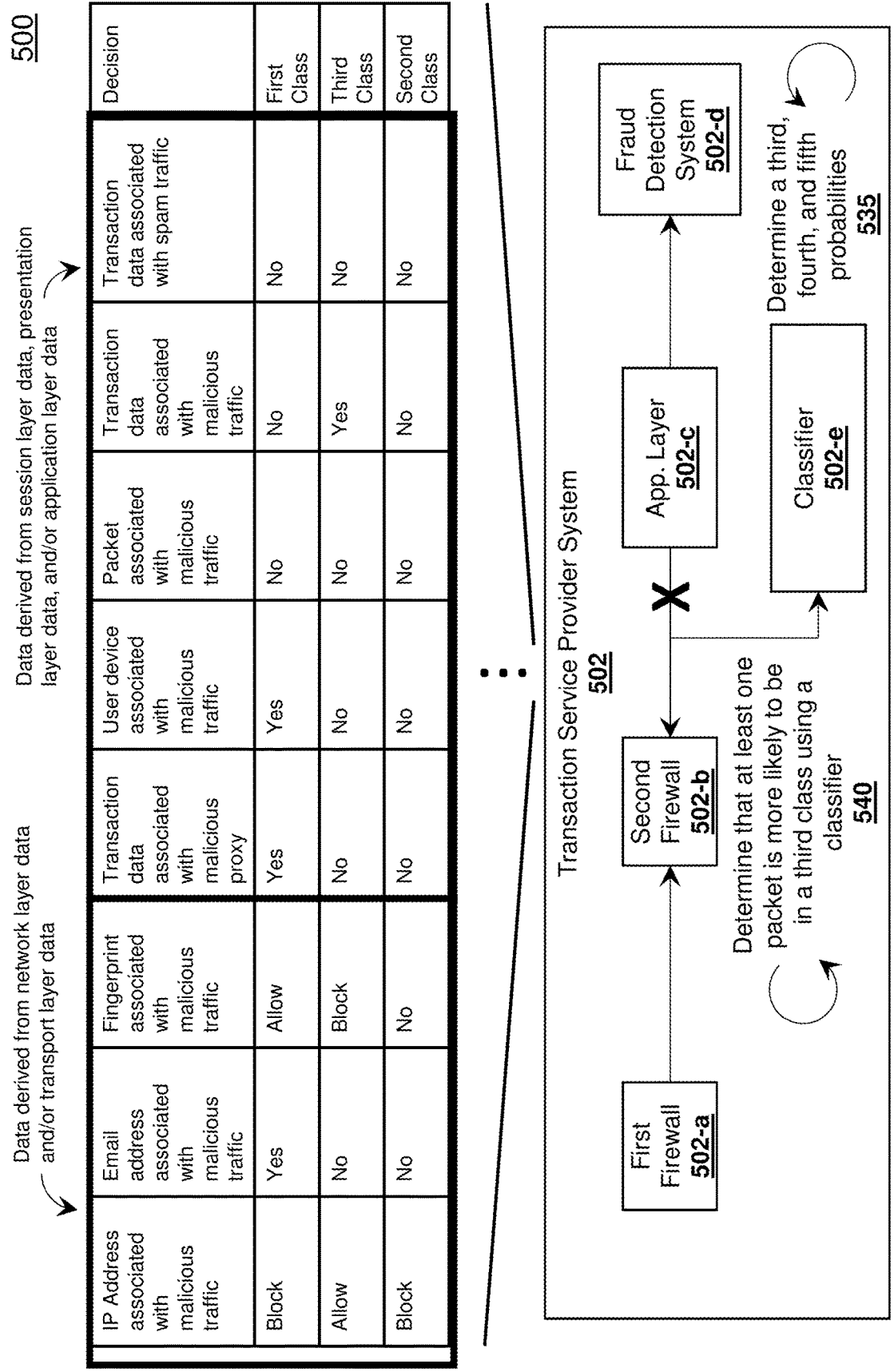

As shown by reference number 535 in FIG. 5D, transaction service provider system 502 may determine a third probability, a fourth probability, and/or a fifth probability using classifier 502-*e*. For example, transaction service provider system 502 may determine the third probability, the fourth probability, and/or the fifth probability based on transaction service provider system 502 receiving the transaction data associated with the payment transaction at second firewall 502-*b*. The third probability may represent a likelihood that at least one packet included in the transaction data is in the first class. The fourth probability may represent a likelihood that the at least one packet included in the transaction data is in the second class. The fifth probability may represent a likelihood that the at least one packet included in the transaction data is in a third class (e.g., a class of payment transactions that may be fraudulent payment transactions and should be subject to additional scrutiny to verify whether the payment transaction is a fraudulent payment transaction). In such an example, transaction service provider system 502 may extract at least one of session layer data, presentation layer data, or application layer data from the header of the at least one packet included in the transaction data at second firewall 502-*b*. Transaction service provider system 502 may then transmit the at least one of session layer data, presentation layer data, or application layer data to classifier 502-*e* to cause classifier 502-*e* to determine the third probability, the fourth probability, and/or the fifth probability based on the at least one of session layer data, presentation layer data, or application layer data and/or at least one of the network layer data or the transport layer data. Where transaction service provider system 502 determines that the third probability is greater than the fourth probability and the fifth probability, transaction service provider system 502 may cause second firewall 502-*b* to block the at least one packet. Where transaction service provider system 502 determines that the fourth probability is greater than the third probability and the fifth probability, transaction service provider system 502 may forego causing second firewall 502-*b* to block the at least one packet. Where transaction service provider system 502 determines that the fifth probability is greater than the third probability and the fourth probability, as shown by reference number 540 in FIG. 5D, transaction service provider system 502 may determine that the at least one packet is more likely to be in a third class. Where transaction service provider system 502 determines that the at least one packet is more likely to be in the third class, as shown by reference number 545 in FIG. 5E, transaction service provider system 502 may cause second firewall 502-*b* to transmit the at least one packet to computing system 514 and request that computing system 514 determine whether the at least one packet is associated with a fraudulent payment transaction or a non-fraudulent payment transaction. In some non-limiting embodiments or aspects, computing system 514 may be included in transaction service provider system 502 and/or in at least one systems of transaction service provider system 502 (e.g., first firewall 502-*a*, second firewall 502-*b*, application layer 502-*c*, and/or fraud detection system 502-*d*).

In some non-limiting embodiments or aspects, transaction service provider system 502 may derive data from the session layer data, the presentation layer data, and/or the application layer data as described herein and transaction service provider system 502 may provide the data derived from the session layer data, the presentation layer data, or the application layer data to classifier 502-*e*. Additionally or alternatively, classifier 502-*e* may derive data from the session layer data, the presentation layer data, or the application layer data as described herein. In some non-limiting embodiments or aspects, transaction service provider system 502 may derive data from the session layer data, the presentation layer data, and/or the application layer data that is associated with passive fingerprinting (e.g., operating system fingerprinting) via TCP flags, time to live (TTL) tags, packet sizes, don't' fragment (DF) flags, whether the data and/or at least one packets included in the data are masquerading to be from a different operating system, and/or the like. In some non-limiting embodiments or aspects, transaction service provider system 502 may derive data from the session layer data, the presentation layer data, and/or the application layer data that is associated with at least one HTTP headers. For example, transaction service provider system 502 may derive data from the session layer data, the presentation layer data, and/or the application layer data that is associated with the at least one headers and transaction service provider system 502 may determine whether the packet has headers that are expected (e.g., headers associated with decrypted data and/or traffic, headers associated with an expected operating system and/or a non-expected operating system, and/or the like). In some non-limiting embodiments or aspects, transaction service provider system 502 may derive data from the session layer data, the presentation layer data, and/or the application layer data that is associated with a fuzzy hash of input values. For example, transaction service provider system 502 may derive data from the session layer data, the presentation layer data, and/or the application layer data that is associated with a fuzzy hash and transaction service provider system 502 may compare percentages of similarly normalized input and/or normalized traffic. In some non-limiting embodiments or aspects, transaction service provider system 502 may derive data from the session layer data, the presentation layer data, and/or the application layer data that is associated with at least one fraud values. For example, transaction service provider system 502 may derive data from the session layer data, the presentation layer data, and/or the application layer data that is associated with an email address, a phone number, a device fingerprint, and/or the like that is flagged (e.g., in at least one databases described herein) as fraudulent or non-fraudulent.

In some non-limiting embodiments or aspects, transaction service provider system 502 may provide at least one of the network layer data, the transport layer data, the session layer data, the presentation layer data, and/or the application layer data to application layer 502-*c* to cause application layer 502-*c* to determine whether the transaction data and/or at least one packets included in the transaction data are associated with the first class, the second class, or the third class. For example, transaction service provider system 502 may derive decrypted values from the at least one of the network layer data, the transport layer data, the session layer data, the presentation layer data, and/or the application layer data such as a PAN, a user identifier, a transaction amount, and/or the like, and provide the decrypted values to application layer 502-*c*. Application layer 502-*c* may then determine whether the transaction data and/or at least one packets included in the transaction data are associated with the first class, the second class, or the third class and transmit or forego transmitting the transaction data and/or the at least one packets included in the transaction data as described herein.

In some non-limiting embodiments or aspects, transaction service provider system 502 may provide at least one of the network layer data, the transport layer data, the session layer data, the presentation layer data, and/or the application layer data to fraud detection system 502-*d* to cause fraud detection system 502-*d* to determine whether the transaction data and/or at least one packets included in the transaction data are associated with the first class, the second class, or the third class. For example, transaction service provider system 502 may derive decrypted values from the at least one of the network layer data, the transport layer data, the session layer data, the presentation layer data, and/or the application layer data as described herein and provide the decrypted values to fraud detection system 502-*d*. Application layer 502-*c* may then determine whether the transaction data and/or at least one packets included in the transaction data are associated with the first class, the second class, or the third class and transmit or forego transmitting the transaction data and/or the at least one packets included in the transaction data as described herein.

Figure 5E:
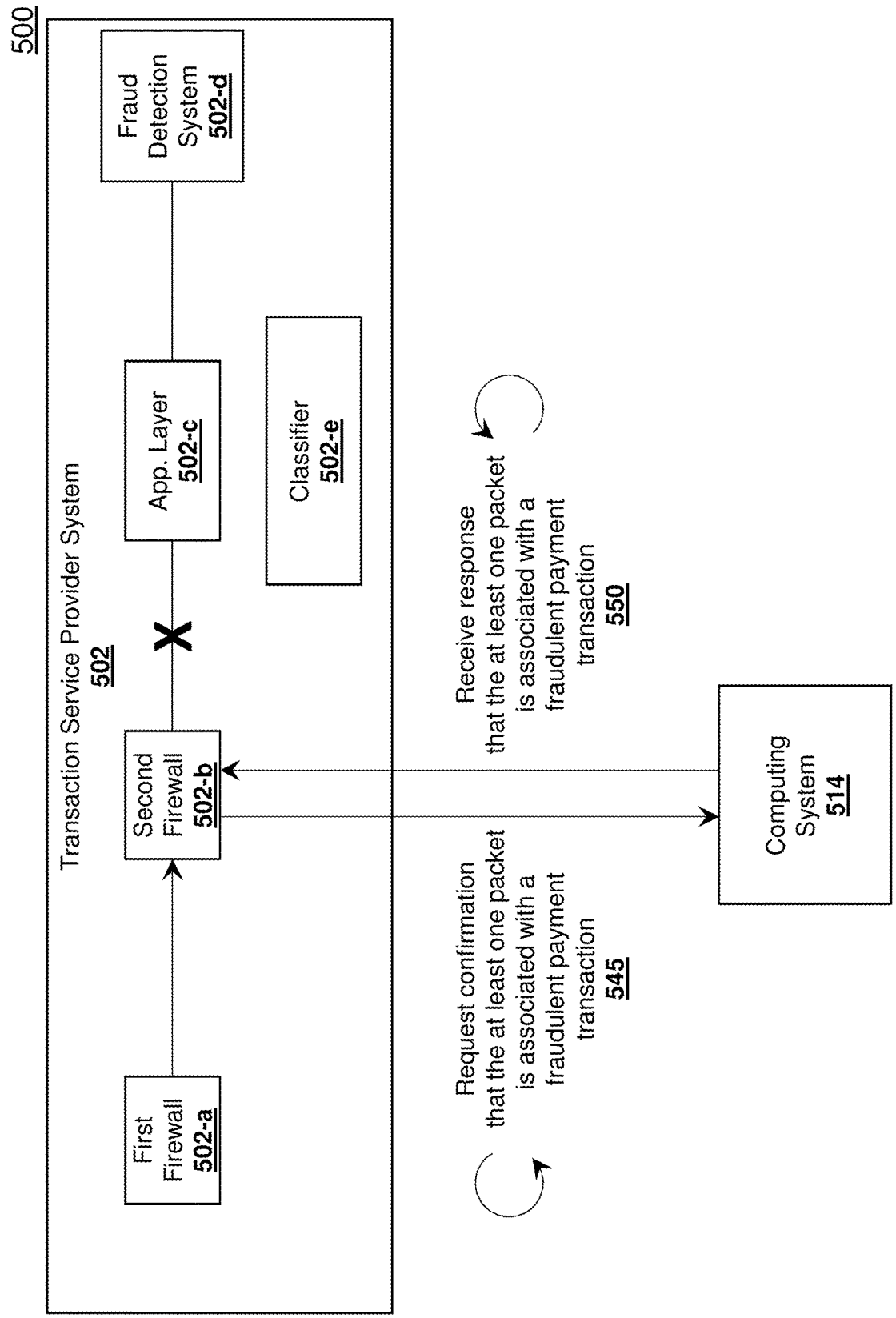

As shown by reference number 550 in FIG. 5E, transaction service provider system 502 may receive a response that the at least one packet is associated with a fraudulent payment transaction. For example, transaction service provider system 502 may receive a response that the at least one packet is associated with a fraudulent payment transaction based on computing system 514 determining that the at least one packet is associated with a fraudulent payment transaction. In such an example, computing system 514 may transmit a message to a user device (e.g., a user device that is the same as or similar to user device 106 of FIG. 1) involved in the payment transaction to cause the user device to display a prompt for input indicating that the user is a valid user (e.g., a prompt such as a reCAPTCHA prompt provided by Google® or an a login prompt to cause the user to provide input indicating that they are a human and not automated software). Additionally or alternatively, computing system 514 may ping the user device to determine if the transaction data came through a proxy or multiple proxies and/or computing system 514 may query a database to determine whether the IP address associated with the user device is associated with malicious data and/or messages. Computing system 514 may then determine a score associated with whether the user associated with the user device is a human and/or an indication as to the likelihood that the transaction data and/or at least one packets included in the transaction data are associated with malicious data and/or malicious packets based on input or a lack of input provided by the user device and either provide the score and/or an indication that the user is or is not a human to transaction service provider system 502. In some non-limiting embodiments or aspects, transaction service provider system 502 may determine whether the payment transaction is a fraudulent payment transaction based on the score and/or the indication that the user is or is not a human.

Figure 5F:
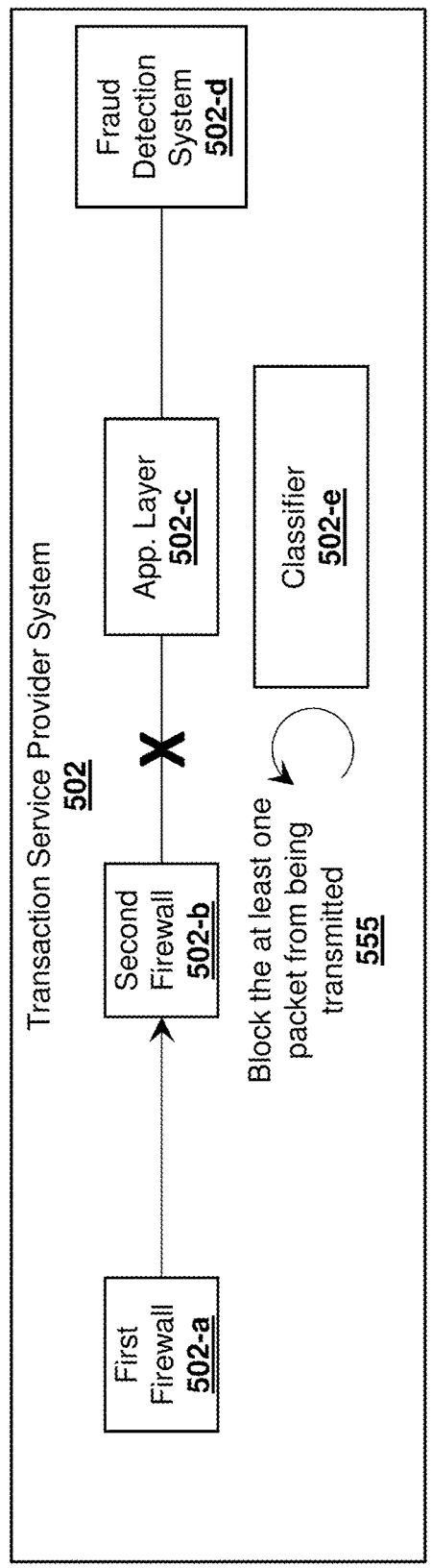

As shown by reference number 555 in FIG. 5F, transaction service provider system 502 may block the at least one packet from being transmitted. For example, transaction service provider system 502 may block the at least one packet from being transmitted based on transaction service provider system 502 determining that the at least one packet is associated with a fraudulent payment transaction. Additionally or alternatively, transaction service provider system 502 may forego blocking the at least one packet from being transmitted based on transaction service provider system 502 determining that the at least one packet is not associated with a fraudulent payment transaction.

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, at least one features of any embodiment can be combined with at least one features of any other embodiment.

What is claimed is:

1. A computer-implemented method, comprising:
   receiving, with at least one processor, transaction data comprising at least one packet associated with a payment transaction;
   extracting, with at least one processor, at least one of network layer data or transport layer data from a header of the at least one packet;
   determining, with at least one processor, a first probability indicating that the at least one packet is in a first class based on the at least one of the network layer data or the transport layer data using a classifier;
   determining with at least one processor, a second probability indicating that the at least one packet is in a second class based on the at least one of the network layer data or the transport layer data using the classifier;
   blocking, with at least one processor, the at least one packet;
   determining that the first probability indicating that the at least one packet is in the first class is less than the second probability indicating that the at least one packet is in the second class;
   extracting at least one of session layer data, presentation layer data, or application layer data from the at least one packet;
   determining a third probability indicating that the at least one packet is in the first class based on the at least one of the session layer data, the presentation layer data, or the application layer data and at least one of the network layer data or the transport layer data using the classifier;
   determining a fourth probability indicating that the at least one packet is in the second class based on the at least one of the session layer data, the presentation layer data, or the application layer data and the at least one of the network layer data or the transport layer data using the classifier; and
   determining a fifth probability indicating that the at least one packet is in a third class based on the at least one of the session layer data, the presentation layer data, or the application layer data and the at least one of the network layer data or the transport layer data using the classifier.

2. The computer-implemented method of claim 1, further comprising:
   determining that the first probability indicating that the at least one packet is in the first class is greater than the second probability indicating that the at least one packet is in the second class,
   wherein blocking the at least one packet from being transmitted comprises blocking the at least one packet based on determining that the first probability indicating that the at least one packet is in the first class is greater than the second probability indicating that the at least one packet is in the second class.

3. The computer-implemented method of claim 1, wherein blocking the at least one packet comprises:
   blocking the at least one packet based on determining that the third probability is greater than the fourth probability and the fifth probability.

4. The computer-implemented method of claim 1, further comprising:
   determining that the fourth probability is greater than the third probability and the fifth probability; and
   forwarding the at least one packet to a separate computing device based on determining that the third probability is greater than the fourth probability and the fifth probability.

5. The computer-implemented method of claim 1, further comprising:
   determining that the fifth probability is greater than the third probability and the fourth probability; and
   forwarding the at least one packet to a separate computing device based on determining that the fifth probability is greater than the third probability and the fourth probability.

6. The computer-implemented method of claim 1, further comprising:
   determining that the fourth probability is greater than the third probability and the fifth probability; and
   forwarding the at least one packet to a risk scoring platform.

7. The computer-implemented method of claim 1, further comprising:
   determining a score associated with the at least one packet based on the at least one of the third probability, the fourth probability, or the fifth probability; and
   adding the score to the header of the at least one packet.

8. A system, comprising:
   at least one hardware processor programmed or configured to:
   receive transaction data comprising at least one packet associated with a payment transaction;
   extract at least one of network layer data or transport layer data from a header of the at least one packet;
   determine a first probability indicating that the at least one packet is in a first class based on the at least one of the network layer data or the transport layer data using a classifier;
   determine a second probability indicating that the at least one packet is in a second class based on the at least one of the network layer data or the transport layer data using the classifier; and
   determine whether the first probability indicating that the at least one packet is in the first class is greater than the second probability indicating that the at least one packet is in the second class, wherein, in response to determining that the first probability indicating that the at least one packet is in the first class is greater than the second probability indicating that the at least one packet is in the second class, the at least one processor is programmed or configured to block the at least one packet;

wherein, in response to determining that the first probability indicating that the at least one packet is in the first class is less than the second probability indicating that the at least one packet is in the second class, the at least one processor is programmed or configured to permit the at least one packet to be transmitted to be forwarded;

determine that the first probability indicating that the at least one packet is in the first class is less than the second probability indicating that the at least one packet is in the second class;

extract at least one of session layer data, presentation layer data, or application layer data from the at least one packet;

determine a third probability indicating that the at least one packet is in the first class based on the at least one of the session layer data, the presentation layer data, or the application layer data and at least one of the network layer data or the transport layer data using the classifier;

determine a fourth probability indicating that the at least one packet is in the second class based on the at least one of the session layer data, the presentation layer data, or the application layer data and the at least one of the network layer data or the transport layer data using the classifier; and determine a fifth probability indicating that the at least one packet is in a third class based on the at least one of the session layer data, the presentation layer data, or the application layer data and the at least one of the network layer data or the transport layer data using the classifier.

9. The system of claim 8, wherein, when blocking the at least one packet, the at least one processor is programmed or configured to:

block the at least one packet based on determining that the third probability is greater than the fourth probability and the fifth probability.

10. The system of claim 8, wherein the at least one processor is further programmed or configured to:

determine that the fourth probability is greater than the third probability and the fifth probability; and forward the at least one packet to a separate computing device based on determining that the third probability is greater than the fourth probability and the fifth probability.

11. The system of claim 8, wherein the at least one processor is further programmed or configured to:

determine that the fifth probability is greater than the third probability and the fourth probability; and forward the at least one packet to a separate computing device based on determining that the fifth probability is greater than the third probability and the fourth probability.

12. The system of claim 8, wherein the at least one processor is further programmed or configured to:

determine that the fourth probability is greater than the third probability and the fifth probability; and forward the at least one packet to a risk scoring platform.

13. The system of claim 8, wherein the at least one processor is further programmed or configured to:

determine a score associated with the at least one packet based on the at least one of the third probability, the fourth probability, or the fifth probability; and add the score to the header of the at least one packet.

14. A computer program product, comprising at least one non-transitory computer-readable medium comprising at least one instructions that, when executed by at least one processor, cause the at least one processor to:

receive transaction data comprising at least one packet associated with a payment transaction;

extract at least one of network layer data or transport layer data from a header of the at least one packet;

determine a first probability indicating that the at least one packet is in a first class based on the at least one of the network layer data or the transport layer data using a classifier;

determine a second probability indicating that the at least one packet is in a second class based on the at least one of the network layer data or the transport layer data using the classifier; and determine whether the first probability indicating that the at least one packet is in the first class is greater than the second probability indicating that the at least one packet is in the second class;

extract at least one of session layer data, presentation layer data, or application layer data from the at least one packet;

determine a third probability indicating that the at least one packet is in the first class based on the at least one of the session layer data, the presentation layer data, or the application layer data and at least one of the network layer data or the transport layer data using the classifier;

determine a fourth probability indicating that the at least one packet is in the second class based on the at least one of the session layer data, the presentation layer data, or the application layer data and the at least one of the network layer data or the transport layer data using the classifier; and determine a fifth probability indicating that the at least one packet is in a third class based on the at least one of the session layer data, the presentation layer data, or the application layer data and the at least one of the network layer data or the transport layer data using the classifier;

wherein, in response to determining that the first probability indicating that the at least one packet is in the first class is greater than the second probability indicating that the at least one packet is in the second class, the at least one instructions cause the at least one processor to block the at least one packet; and wherein, in response to determining that the first probability indicating that the at least one packet is in the first class is less than the second probability indicating that the at least one packet is in the second class, the at least one instructions cause the at least one processor to permit the at least one packet to be transmitted to be forwarded.

15. The computer program product of claim 14, wherein the at least one instructions that cause the at least one processor to block the at least one packet cause the at least one processor to:

block the at least one packet based on determining that the third probability is greater than the fourth probability and the fifth probability.

16. The computer program product of claim 14, wherein the at least one instructions further cause the at least one processor to:
- determine that the fifth probability is greater than the third probability and the fourth probability; and
- forward the at least one packet to a separate computing device based on determining that the fifth probability is greater than the third probability and the fourth probability.

17. The computer program product of claim 14, wherein the at least one instructions further cause the at least one processor to:
- determine that the fourth probability is greater than the third probability and the fifth probability; and
- forward the at least one packet to a risk scoring platform.

18. The computer program product of claim 14, wherein the at least one instructions further cause the at least one processor to:
- determine a score associated with the at least one packet based on the at least one of the third probability, the fourth probability, or the fifth probability; and
- add the score to the header of the at least one packet.

* * * * *